US011528999B2

(12) United States Patent
Renwei

(10) Patent No.: US 11,528,999 B2
(45) Date of Patent: Dec. 20, 2022

(54) MULTILAYER COVERS

(71) Applicant: Xia Renwei, Kunshan (CN)

(72) Inventor: Xia Renwei, Kunshan (CN)

( * ) Notice: Subject to any disclaimer, the term of this patent is extended or adjusted under 35 U.S.C. 154(b) by 847 days.

(21) Appl. No.: 16/367,225

(22) Filed: Mar. 27, 2019

(65) Prior Publication Data
US 2019/0298079 A1 Oct. 3, 2019

Related U.S. Application Data

(60) Provisional application No. 62/649,367, filed on Mar. 28, 2018.

(51) Int. Cl.
| | | |
|---|---|---|
| *B32B 37/12* | (2006.01) |
| *A47C 31/11* | (2006.01) |
| *B32B 37/16* | (2006.01) |
| *B32B 27/40* | (2006.01) |
| *B63B 17/02* | (2006.01) |
| *A47J 37/07* | (2006.01) |
| *E04H 4/10* | (2006.01) |

(Continued)

(52) U.S. Cl.
CPC ......... *A47C 31/116* (2013.01); *A47J 37/0786* (2013.01); *B32B 27/12* (2013.01); *B32B 27/40* (2013.01); *B32B 37/12* (2013.01); *B32B 37/16* (2013.01); *B60J 11/00* (2013.01); *B63B 17/02* (2013.01); *E04H 4/10* (2013.01)

(58) Field of Classification Search
CPC .......... B32B 2605/003; B32B 2601/00; B32B 37/16; B32B 2262/062; B32B 2250/03; B32B 2262/0276; B32B 7/12; B32B 2262/0261; B32B 5/026; B32B 5/024; B32B 3/266; B32B 37/20; B32B 2307/732; B32B 5/10; B32B 2307/724; B32B 2250/02; B32B 37/12; B32B 2571/00; B32B 3/08; B32B 27/40; B32B 2250/40; B32B 27/12; B32B 37/1284; B32B 2307/546; B32B 2307/726; B60J 11/00; B63B 17/02; A47C 31/116; E04H 4/10; A47J 37/0786
See application file for complete search history.

(56) References Cited

U.S. PATENT DOCUMENTS

| | | | | |
|---|---|---|---|---|
| 5,755,900 A | * | 5/1998 | Weir | ......................... B32B 5/22 |
| | | | | 156/244.27 |
| 9,155,397 B2 | | 10/2015 | D'Amato et al. | |
| 2010/0062231 A1 | * | 3/2010 | Abed | ...................... B32B 27/40 |
| | | | | 156/244.11 |

* cited by examiner

*Primary Examiner* — Vishal I Patel
(74) *Attorney, Agent, or Firm* — Loza & Loza, LLP; Heidi L. Eisenhut

(57) ABSTRACT

Multilayer material may be made by applying bonding agent to a surface of a first-material and/or a second-material then bringing these materials adjacent to each other to bring the bonding agent into contact with opposing surfaces thereof and feeding the first-material and the second-material with the bonding agent therebetween into a machine to bond the first-material to the second-material to form the multilayer material. A cover for an object used outdoors may be made from a plurality of multilayer panels. A ventilation opening may be formed in a first multilayer panel, the ventilation opening may be covered with a ventilation cover, which may also be a handle, where the ventilation cover shields the ventilation opening from weather and defines walls of a passageway in an exterior space outside the cover, to provide for airflow through the ventilation opening between the exterior space and an interior space within the cover.

9 Claims, 14 Drawing Sheets

(51) Int. Cl.
*B60J 11/00* (2006.01)
*B32B 27/12* (2006.01)

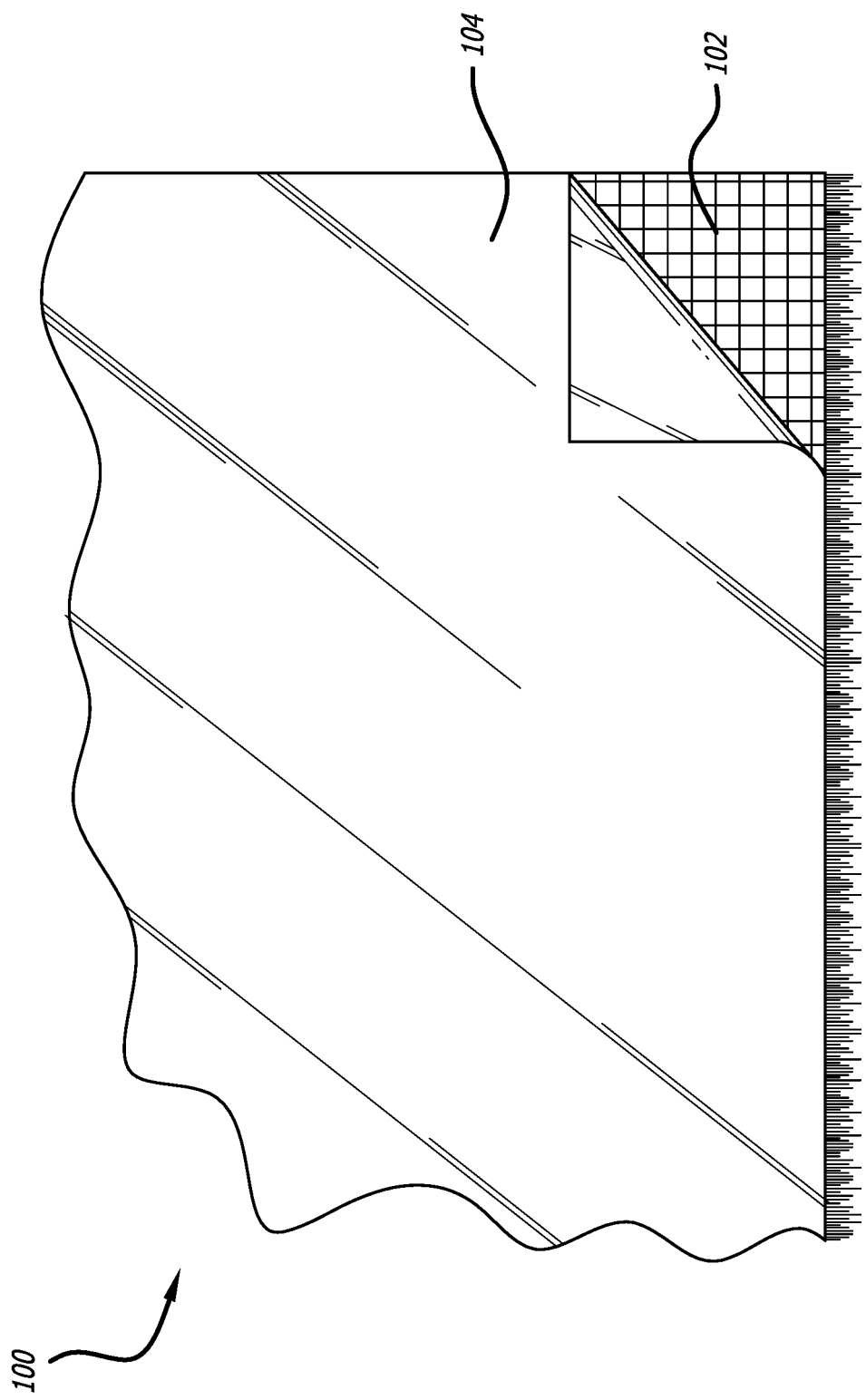

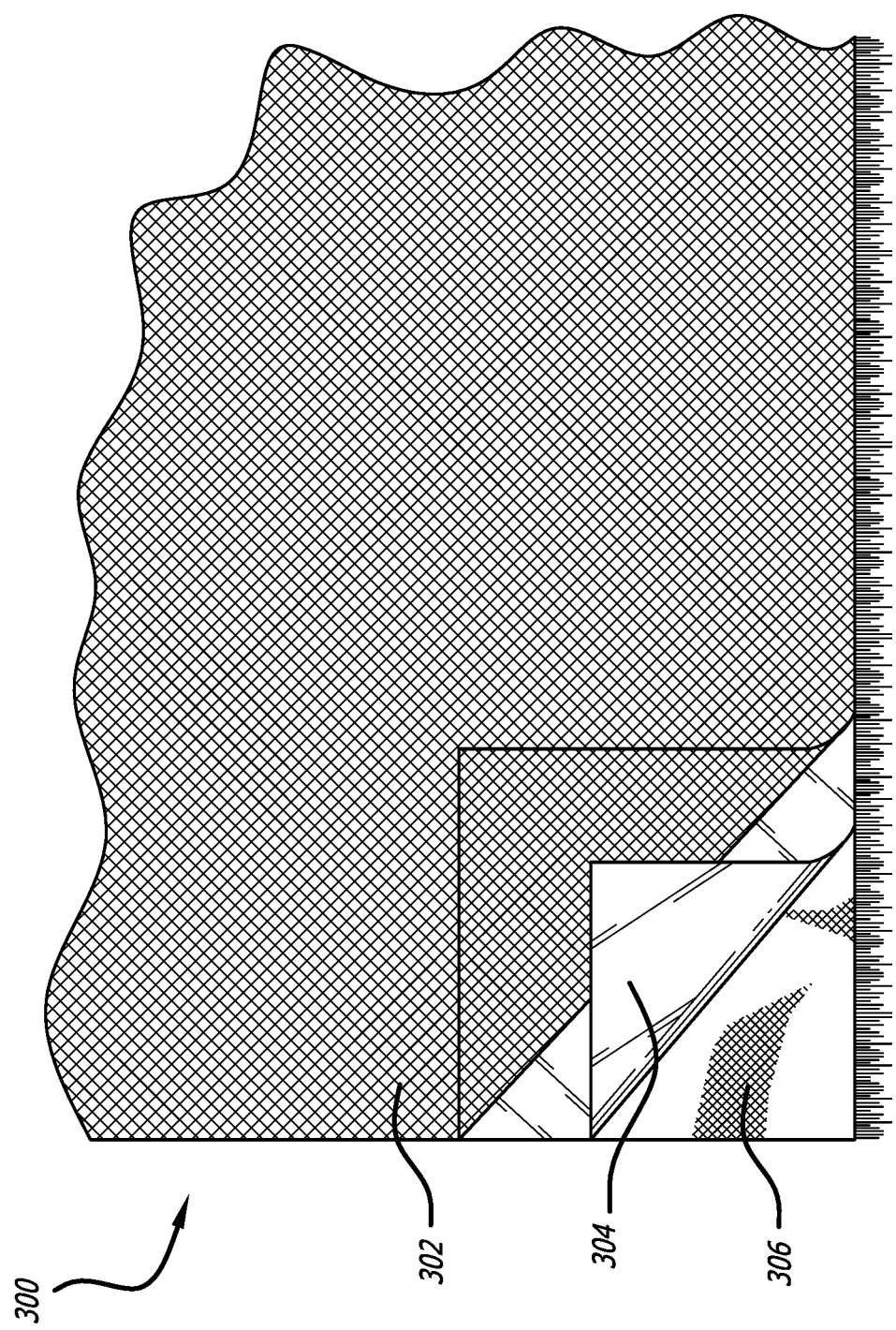

MULTILAYER COVERS

PRIORITY CLAIM

This application claims priority to U.S. Provisional Application No. 62/649,367, filed Mar. 28, 2018, titled Multi-Layer Protective Covers, the contents of which is incorporated by reference herein.

FIELD

The present disclosure relates to multilayer covers, and more specifically to multilayer covers used to cover and/or protect objects such as furniture, barbecues, televisions, entertainment systems, air conditioners, cars, boats, yachts, pools, spas and any other object which are exposed to outdoor weather.

BACKGROUND

Objects, for example furniture, including chairs, tables, benches and lounges, as well as other objects including barbecues, televisions, entertainment systems and more, are commonly placed outside in backyards, gardens and recreational areas. It is common for these objects to be covered when not in use to limit exposure to environmental elements including, but not limited to, rain, snow, sunlight, bleaching sunlight, wind, hail, dust, precipitation, temperature and humidity.

These objects are exposed to all kinds of environmental elements, for long periods of time, even in periods of time when the object is not in use. Such periods include winter, stormy weather, night-time etc. During these periods of non-use, the typical home owner typically covers these objects, such as outdoor furniture, with covers which are made specifically to cover the object (e.g., a cover shaped to cover a chair, a cover shaped to cover a lounge, a cover shaped to cover a barbecue, etc.).

Conventional covers are made of a single layer of material, such as a polyester fabric or other raw material fabric. Either the front surface or the back surface of the single layer of material is then coated by melting polyvinyl chloride (PVC) or polyurethane (PU) and applying the melted PVC or PU to the front surface or the back surface of the single layer material. By way of example, furniture covers on the market today are made of only a single layer of material (e.g., polyester fabric, nylon fabric, or other raw material fabric) that is coated with a melted layer of PVC or PU.

BRIEF SUMMARY OF SOME EXAMPLES

According to one example described herein, a method of making a multilayer material may include operations related to obtaining a first-material, obtaining a second-material, applying a bonding agent to a surface of at least one of the first-material or the second-material, bringing the first-material and the second-material adjacent to each other to bring the bonding agent into contact with opposing surfaces of the first-material and the second-material, and feeding the first-material and the second-material with the bonding agent therebetween into a machine to bond the first-material to the second-material to form the multilayer material.

In some examples, the first-material may be a fabric and the second-material may be a thermoplastic polyurethane (TPU) film. In some examples the multilayer material is a two-layer material. The method may also include cutting the multilayer material into a plurality of multilayer panels. In one example the machine may use at least one of pressure, heat, or microwave energy to bond the first-material to the second-material to form the multilayer material. According to some examples, the machine may be a laminating machine and the multilayer material may be a multilayer laminated material. In one example, the first-material may be a fabric configured to face an exterior space that is exposed to weather and the second-material may be a thermoplastic polyurethane (TPU) film configured to face an interior space sheltered from the weather. The first-material may be a knitted or woven fabric made from a knitted or woven fiber, thread, or filament.

In some examples, the first-material may be a pre-manufactured multilayer material comprised of at least two-layers of different materials and the second-material may be different from at least one layer of the pre-manufactured multilayer material. In one example, the first-material (i.e., the pre-manufactured multilayer material) may be comprised of a first fabric bonded to a thermoplastic polyurethane (TPU) film, and the TPU film may be disposed between the first fabric and the second-material. According to one example, the multilayer material that is formed may be a three-layer material. In these examples, the at least one of the first fabric or the second-material may be a knitted or woven fabric made from a knitted or woven fiber, thread, or filament.

According to another example, a method of making a cover for an object used outdoors, the cover fitting over the object and including left, right, front, back, and top sides, may include obtaining a plurality of multilayer panels that, when fixed together, form the cover, where the cover divides an exterior space that is exposed to weather from an interior space sheltered from the weather, the cover configured to receive the object within the interior space. The method may also include forming a ventilation opening having a left, top, right, and bottom perimeter in a first multilayer panel of the plurality of multilayer panels, the ventilation opening defined by edges of the first multilayer panel that define the perimeter of the ventilation opening. The method may still further include covering the ventilation opening with a ventilation cover by, for example, fixing the ventilation cover to an exterior surface of the first multilayer panel adjacent to the left, top, and right perimeter of the ventilation opening, wherein the ventilation cover shields the ventilation opening from the weather in the exterior space and defines walls of a passageway in the exterior space to provide for airflow through the ventilation opening between the exterior space and the interior space, and fixing the plurality of multilayer panels, including the first multilayer panel, to each other to form the cover, wherein the ventilation cover additionally serves as a handle when lifting the cover from the object.

In some examples, the ventilation cover may be constructed of: a front panel having a left edge, a right edge, a top edge, and a bottom edge; a left panel having a left panel proximal edge and a left panel distal edge relative to the exterior surface of the first multilayer panel and a left panel top edge and a left panel bottom edge; and a right panel having a right panel proximal edge and a right panel distal edge relative to the exterior surface of the first multilayer panel and a right panel top edge and a right panel bottom edge. In such an example, the left panel distal edge of the left panel may be fixed to the left edge of the front panel, the right panel distal edge of the right panel may be fixed to the right edge of the front panel, the bottom edge of the front panel may extend past the left panel bottom edge of the left panel and the right panel bottom edge of the right panel to form a flap that is configured to fold back to be adjacent to an outside surface of the front panel, wherein the left panel proximal edge of the left panel, the top edge of the front panel, and the right panel proximal edge of the right panel are fixed to the first multilayer panel along a seam adjacent to the left, top, and right perimeter of the ventilation opening.

In such examples, the ventilation cover comprise a first pocket having as a proximal wall, a portion of the first multilayer panel adjacent to and including the ventilation opening, and as a distal wall, adjacent to the proximal wall and covering the ventilation opening, a front panel coupled to the portion of the first multilayer panel along a seam adjacent to the left, top, and right perimeter of the ventilation opening and providing a first pocket having a downward facing entrance configured to remain open. In such examples the first pocket, from the first pocket entrance to the ventilation opening may define the walls of the passageway in the exterior space to provide for airflow through the ventilation opening between the exterior space and the interior space. The front panel may extend downward, past bottom left and right edges of the seam, to form a flap that is configured to fold back to be adjacent to an outside surface of the front panel substantially along a line joining bottom left and right edges of the seam.

In some examples, the method may include fixing a sub-panel to the flap, along left, bottom, and right edges of the flap, below the line joining bottom left and right edges of the seam on a side of the flap that opposes the first multilayer panel when the flap is pointed down, to form a second pocket having the sub-panel as a second pocket proximal wall and a portion of the flap adjacent to and opposing the sub-panel as a second pocket distal wall. In such an example the flap may be folded back to be adjacent to the outside surface of the front panel to provide a second pocket having a downward facing entrance that lies in substantially a same horizontal plane as the first pocket entrance. In some examples, the second pocket may be the handle.

According to another aspect, a cover for an object used outdoors, the cover fitting over the object and including left, right, front, back, and top sides may be described. The cover may include a plurality of multilayer panels fixed together to form the cover, wherein the cover divides an exterior space that is exposed to weather from an interior space sheltered from the weather, the cover configured to receive the object within the interior space. The cover may also include a ventilation opening having a left, top, right, and bottom perimeter in a first multilayer panel of the plurality of multilayer panels, the ventilation opening defined by edges of the first multilayer panel that define the perimeter of the ventilation opening. The cover may still further include a first pocket having as a proximal wall, a portion of the first multilayer panel adjacent to and including the ventilation opening, and as a distal wall, adjacent to the proximal wall and covering the ventilation opening, a front panel coupled to the first multilayer panel along a seam adjacent to the left, top, and right perimeter of the ventilation opening the first pocket having a downward facing first pocket entrance configured to remain open. According to such aspects, the first pocket, from the first pocket entrance to the ventilation opening, may define walls of a passageway in the exterior space to provide for airflow through the ventilation opening between the exterior space and the interior space and the front panel serves as a handle when lifting the cover from the object.

In some examples, the front panel may extend downward, past bottom left and right edges of the seam, to form a flap that is configured to fold back to be adjacent to an outside surface of the front panel substantially along a line joining bottom left and right edges of the seam.

In some examples, the cover may also include a second pocket comprised of a sub-panel fixed to the flap along left, bottom, and right edges of the flap, below the line joining bottom left and right edges of the seam on a side of the flap that opposes the first multilayer panel when the flap is pointed down. In such examples, when the flap is folded back to be adjacent to the outside surface of the front panel, the second pocket may present a downward facing second pocket entrance that lies in substantially a same horizontal plane as the first pocket entrance. According to some aspects, the second pocket may be the handle.

BRIEF DESCRIPTIONS OF THE DRAWINGS

FIG. 1B is a bottom perspective view of the exemplary sample of the first multilayer material of FIG. 1A.

FIG. 3A is a top perspective view of an exemplary sample of a second multilayer material, according to an embodiment described herein.

DETAILED DESCRIPTION

The following detailed description is of the best currently contemplated modes of carrying out the invention. The description is not to be taken in a limiting sense but is made merely for the purpose of illustrating the general principles of the invention, since the scope of the invention is best defined by the appended claims.

Multilayer Material (Two-Layer Example)

Figure 1A:
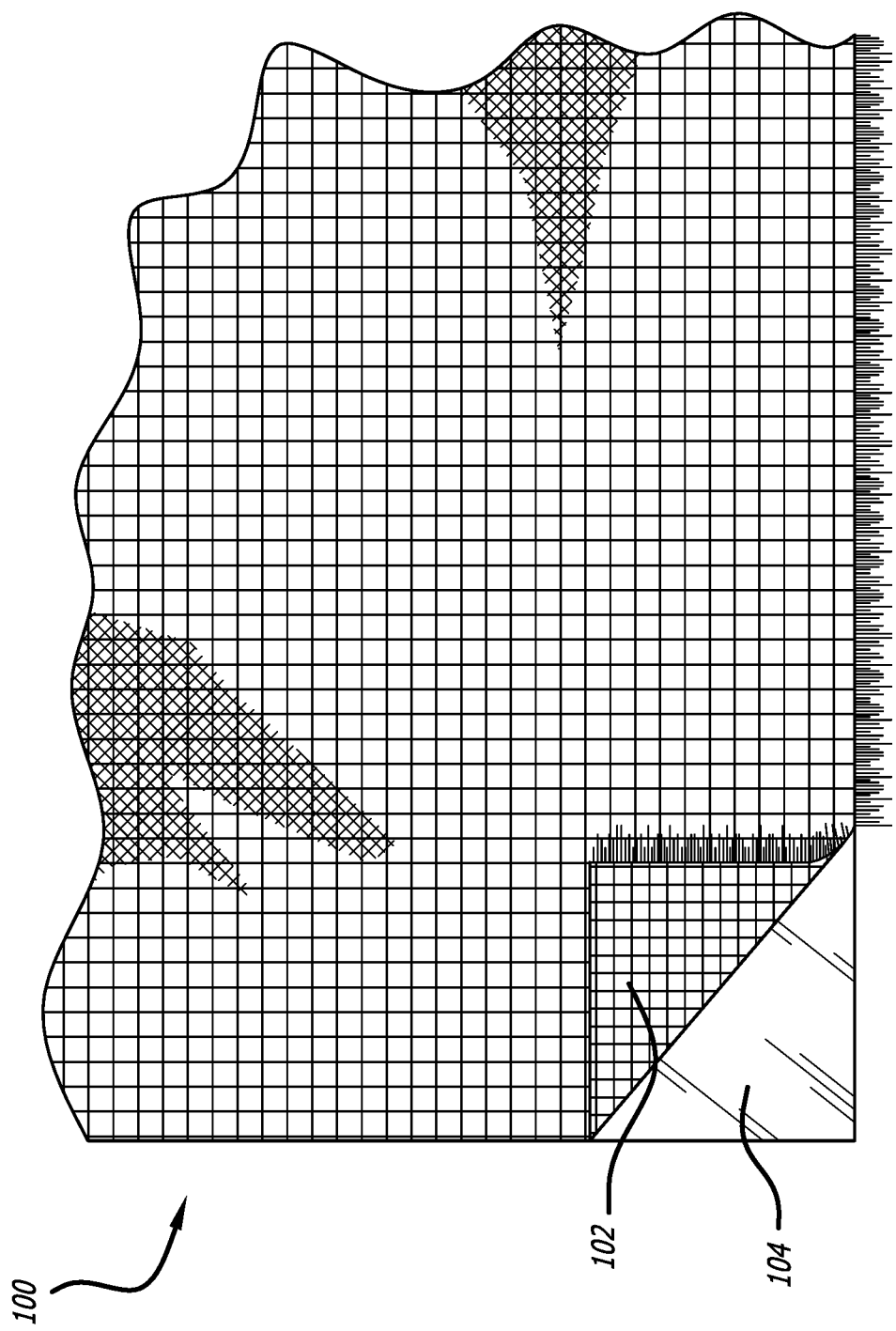
FIG. 1A is a top perspective view of an exemplary sample of a first multilayer material, according to an embodiment described herein.

FIG. 1A is a top perspective view of an exemplary sample of a first multilayer material 100, according to an embodiment described herein. In the example of FIG. 1A the first multilayer material 100 is a two-layer material. The first multilayer material 100 may be a multilayer bonded or a multilayer laminated material. As used herein, the word "material" may mean, but is not limited to any fabric, textile, and/or film. As used herein, the word "laminated" may mean manufactured by placing layer on layer and may indicate that adjacent layers are bonded to each other.

According to one aspect of the present disclosure, material for a cover (e.g., a cover for furniture, barbecues, televisions, entertainment systems, air conditioners, cars, boats, yachts, pools, spas, etc.) may comprise two separate layers of material bonded together (e.g., a laminated material), and may be referred to, in the bonded/laminated state, as a multilayer material (e.g., a multi-ply material).

A first-material 102 may be, for example, a knitted or woven fabric made from a knitted or woven fiber, thread, or filament (e.g., polyester, nylon, or cotton fiber, thread, or filament). In the exemplary embodiment of FIG. 1, the first-material 102 may be a fabric manufactured as a ripstop polyester fabric. The polyester may initially be a raw fiber, thread, or filament material and different thicknesses may be used including, but not limited to, 200 D/100 D/600 D/150 D (where D stands for Denier and is a unit of measure for the liner mass density of fibers. D is the mass in grams per 9000 meters of fiber). Although the first-material 102 is described as being made from a polyester ripstop fabric, this is by way of example only and the first-material 102 may be made from any type of fabric known in the art, such as, but not limited to, oxford fabric, knitted fabric, woven fabric, ripstop fabric, velvet fabric and any other fabric known in the art. According to one example, the first-material 102 may have a thickness of about five mm. Other types of materials and other thicknesses are within the scope of the disclosure. Prior to forming the first multilayer material 100 (e.g., two-layer material), the first-material 102 may be stored, for example, as rolled stock or sheet stock.

A second-material 104 may be made from a thermoplastic polyurethane (TPU) film or sheet (hereinafter referred to as TPU film). The TPU film may be formed by melting TPU granules and forming the melted TPU into a film or a sheet form. Although the second-material 104 is described as made from a TPU film, this is by way of example only and the second-material 104 may be made from any material known in the art to have with the same or similar properties (e.g., air permeability, water permeability, flexibility, etc.). Prior to forming the first multilayer material 100 (e.g., two-layer material), the TPU film may be stored, for example, as rolled stock or sheet stock.

The first-material 102 and the second-material 104 may be independent of each other. The first-material 102 and the second-material 104 may be manufactured separately. The first-material 102 and the second-material 104 may have different properties (e.g., air permeability, water permeability, flexibility, etc.). The first-material 102 and the second-material 104 may be bonded to each other to form a first multilayer material 100 (e.g., two-layer material). A glue, cement, adhesive, or any other product know in the art (individually or collectively referred to herein as a bonding agent) may be used to bond or weld (collectively or individually referred to herein as bond) the first-material 102 to the second-material 104. According to one exemplary process, a bonding agent may be applied to one or both of the facing surfaces of the first-material 102 and the second-material 104, the first-material 102 and the second-material 104 may be brought adjacent to each other, to bring the bonding agent into contact with opposing surfaces of the first-material 102 and the second-material 104, and then the first-material 102 and the second-material 104 with the bonding agent therebetween may be fed into a machine to bond the first-material 102 to the second-material 104 and thereby form the first multilayer material 100. According to some examples, the machine uses at least one of pressure, heat, or microwave energy to bond the first-material 102 to the second-material 104 to form the first multilayer material 100. According to some examples, the machine may be a laminating machine and the first multilayer material 100 may be referred to as a multilayer laminated material. After the first multilayer material 100 is produced, it may be stored, for example, as rolled stock or sheet stock.

FIG. 1B is a bottom perspective view of the exemplary sample of the first multilayer material 100 of FIG. 1A. A corner of the first multilayer material 100 has been peeled apart for the purposes of this illustration, to show the relationship between the first-material 102 and the second-material 104. A layer of bonding agent (not shown) between the first-material 102 and the second-material 104 is not illustrated to avoid cluttering the drawing.

Figure 2A:
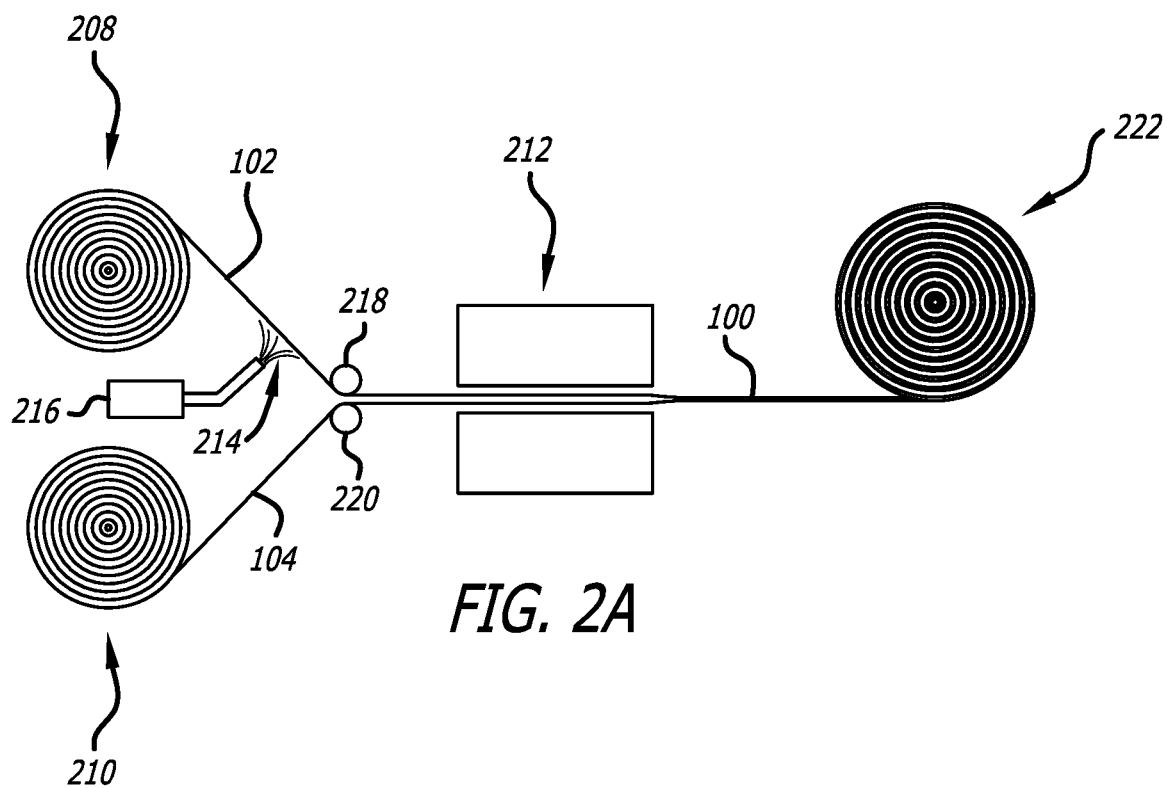
FIG. 2A is a simplified graphical depiction of a set of machines that may be used to bond opposing faces of a first-material and a second-material, to form a first multilayer material (e.g., a two-layer material), according to aspects described herein.

FIG. 2A is a simplified graphical depiction of a set of machines that may be used to bond opposing faces of a first-material 102 and a second-material 104, to form a first multilayer material 100 (e.g., a two-layer material), according to aspects described herein.

As depicted in FIG. 2A, the first-material 102 (e.g., a knitted or woven fabric made from a knitted or woven fiber, thread, or filament, such as polyester, nylon, or cotton fiber, thread, or filament)) and the second-material 104 (e.g., TPU film) may each be provided as rolled stock. A first roll 208 of the first-material 102 and a second roll 210 of the second-material 104 are depicted. Although the first-material 102 and the second-material 104 are shown as rolled stock, this is by way of example only and the first-material 102 and/or the second-material 104 may be provided in any form known in the art, such as, but not limited to, sheet tock. The first multilayer material 100 may be rolled into/onto a roll 222, or stored in any other way as known in the art.

The set of machines includes a first roller 218, a second roller 220, and a bonding agent applicator 216, which may spray or otherwise application a bonding agent 214 to one or both opposing surfaces of the first-material 102 and second-material 104. The first roller 218 and the second roller 220 may bring the first-material 102 and the second-material 104 adjacent to each other to bring the bonding agent 214 into contact with opposing surfaces of the first-material 102 and the second-material 104. The first-material 102 and the second-material 104 with the bonding agent 214 therebetween may be fed into a machine 212 to bond the first-material 102 to the second-material 104 and thereby to form the first multilayer material 100. The machine 212 may use, for example, at least one of pressure, heat, or microwave energy to bond the first-material 102 to the second-material 104 and form the first multilayer material 100. According to some examples, the machine 212 may be referred to as a laminating machine and the first multilayer material 100 may be referred to as a multilayer laminated material.

The machine 212 may include a heating press function (not shown). The heating press function may help the bonding agent 214 (e.g., hot melted glue) to spread or flow between, and in some examples into, the opposing surfaces of the first-material 102 and the second-material 104. The heating press function may also assist in curing the bonding agent 214. In some examples, an additional process of curing the first multilayer material 100 may occur. In some examples, curing may take one to two days. According to some examples, the first-material 102 may be a fabric and the second-material 104 may be a thermoplastic polyurethane (TPU) film, and the first multilayer material 100 may be a two-layer material.

Figure 2B:
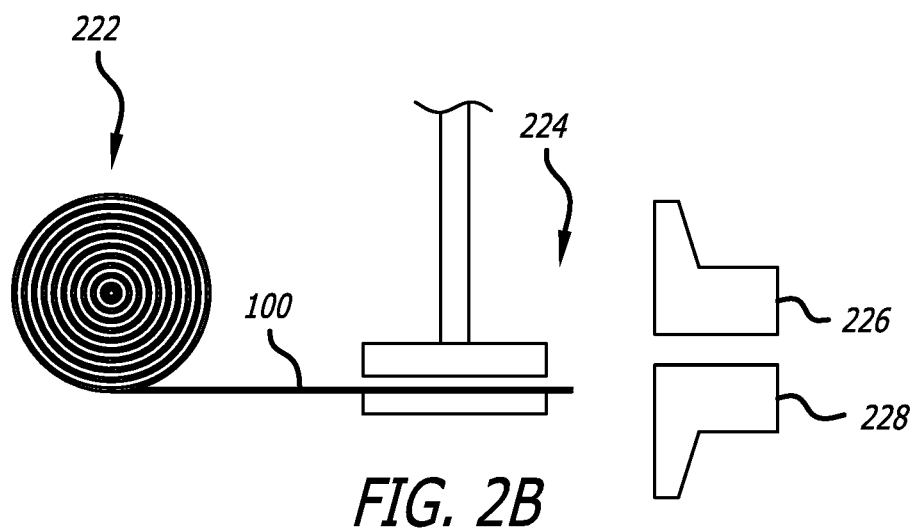
FIG. 2B is a simplified graphical depiction of a die-cutting machine that may be used to cut the first multilayer material into a plurality of multilayer panels (e.g., pattern pieces) that may be used, for example, to form a cover as described herein.

FIG. 2B is a simplified graphical depiction of a die-cutting machine 224 that may be used to cut the first multilayer material 100 into a plurality of multilayer panels 226 and 228 (e.g., pattern pieces) that may be used, for example, to form a cover as described herein.

According to one method, first multilayer material 100 may be fed into the die-cutting machine 224. In the example of FIG. 2B, the first multilayer material 100 is fed into the die-cutting machine 224 from a roll 222 of the first multilayer material 100. In other examples (not shown) individual lengths or sheets of the first multilayer material 100 may be individually and separately fed into the die-cutting machine 224. The individual lengths or sheets of the first multilayer material 100 may be cut, for example, from the roll 222 of the first multilayer material 100. For exemplary purposes, only one thickness of the first multilayer material 100 is shown within the die-cutting machine 224. One or more panels (e.g., pattern pieces), such as multilayer panels 226 and 228 (e.g., two-layer panels) of a cover of a chair can be cut from the first multilayer material 100 with one die-cutting operation (i.e., one pressing of a die of the die-cutting machine 224 through the one thickness of the first multilayer material 100). However, a plurality of thicknesses of the first multilayer material 100 may be stacked one upon the other within the die-cutting machine 224 so that a plurality of one or more panels (e.g., a plurality of pattern pieces), such as a plurality of multilayer panels 226 and 228 (e.g., two-layer panels) of a cover of a chair can be cut from the stacked plurality of thicknesses of the first multilayer material 100 with one die-cut operation (i.e., one pressing of a die of the die-cutting machine 224 through the plurality of thickness of the first multilayer material 100). Panels, including front panels and pocket side panels sub-panels, all as described and exemplified herein, may also be cut from the first multilayer material 100. Although a die-cutting machine 224 is described for use in cutting panels from the first multilayer material 100, this is by way of example only and multilayer panels 226 and 228 (e.g., two-layer panels) may be cut from the first multilayer material 100 using any method and/or machine known in the art, such as, but not limited to, a scissors or an electrically operated fabric cutting device used to cut pattern pieces from a stack of fabric according to aspects described herein.

Multilayer Material (Three-Layer Example)

FIG. 3A is a top perspective view of an exemplary sample of a second multilayer material 300, according to an embodiment described herein. In the example of FIG. 3A, the second multilayer material 300 is a three-layer material. The second multilayer material 300 may be a multilayer bonded or a multilayer laminated material.

According to one aspect of the present disclosure, material for a cover (e.g., a cover for furniture, barbecues, televisions, entertainment systems, air conditioners, cars, boats, yachts, pools, spas, etc.) may comprise three separate layers of material bonded together (e.g., a laminated material), and may be referred to, in the bonded/laminated state, as a multilayer material (e.g., a multi-ply material).

A first-material 302 may be, for example, a knitted or woven fabric made from a knitted or woven fiber, thread, or filament (e.g., polyester, nylon, or cotton fiber, thread, or filament). In the exemplary embodiment of FIG. 3A, the first-material 302 may be a fabric manufactured as a polyester fabric. The polyester may initially be a raw fiber, thread, or filament material and different thicknesses may be used including, but not limited to, 200 D/100 D/600 D/150 D (where D stands for Denier and is a unit of measure for the linear mass density of fibers. D is the mass in grams per 9000 meters of fiber). Although the first-material 302 is described as made from a polyester fabric, this is by way of example only and the first-material 302 may be made from any type of fabric known in the art, such as, but not limited to, oxford fabric, knitted fabric, woven fabric, ripstop fabric, velvet fabric and any other fabric known in the art. According to one example, the first-material 302 may have a thickness of about five mm. Other types of materials and other thicknesses are within the scope of the disclosure. Prior to forming the second multilayer material 300 (e.g., three-layer material), the first-material 302 may be stored, for example, as rolled stock or sheet stock.

A second-material 304 may be made from a thermoplastic polyurethane (TPU) film or sheet (hereinafter referred to as TPU film). The TPU film may be formed by melting TPU granules and forming the melted TPU into a film or sheet form. Although the second-material 304 is described as made from a TPU film, this is by way of example only and the second-material 304 may be made from any material known in the art to have with the same or similar properties (e.g., air permeability, water permeability, flexibility, etc.). Prior to forming the second multilayer material 300 (e.g., three-layer material), the TPU film may be stored, for example, as rolled stock or sheet stock.

The first-material 302 and the second-material 304 may be independent of each other. The first-material 302 and the second-material 304 may be manufactured separately. The first-material 302 and the second-material 304 may have different properties (e.g., air permeability, water permeability, flexibility, etc.). The first-material 302 and the second-material 304 may have already been bonded to each other and supplied as a pre-manufactured multilayer material (not shown but exemplified in FIG. 4A as pre-manufactured multilayer material 403 (a two-layer material similar to first multilayer material 100, FIGS. 1A, 1B, 2A, 2B). A glue, cement, adhesive, or any other product know in the art (individually or collectively referred to herein as a bonding agent) may be used to bond or weld (collectively or individually referred to herein as bond) the first-material 302 to the second-material 304. The exemplary process of bonding the first-material 302 to the second-material 304 to form the pre-manufactured multilayer material 403 is the same as or similar to the exemplary process of bonding the first-material 102 to the second-material 104 to form the first multilayer material 100 as-described above in connection with FIGS. 1A, 1B, and 2 and will not be repeated here, to avoid redundancy. As with the first multilayer material 100, after the pre-manufactured multilayer material 403 is produced, it may be stored, for example, as rolled stock or sheet stock.

A third-material 306 may be, for example, a knitted or woven fabric made from a knitted or woven fiber, thread, or filament (e.g., polyester, nylon, or cotton fiber, thread, or filament). In the exemplary embodiment of FIG. 3A, the third-material 306 may be a fabric manufactured as a knitted polyester fabric. The polyester may initially be a raw fiber, thread, or filament material and different thicknesses may be used including, but not limited to, 200 D/100 D/600 D/150 D (where D stands for Denier and is a unit of measure for the linear mass density of fibers. D is the mass in grams per 9000 meters of fiber). Although the third-material 306 is described a knitted polyester fabric, this is by way of example only and the third-material 306 may be made from any type of fabric known in the art, such as, but not limited to, oxford fabric, knitted fabric, woven fabric, ripstop fabric, velvet fabric and any other fabric known in the art. According to one example, the third-material 306 may have a thickness of about five mm. Other types of materials (e.g., fabrics or films) and other thicknesses are within the scope of the disclosure. Prior to forming the second multilayer material 300 (e.g., three-layer material), the third-material 306 may be stored, for example, as rolled stock or sheet stock.

Figure 3B:
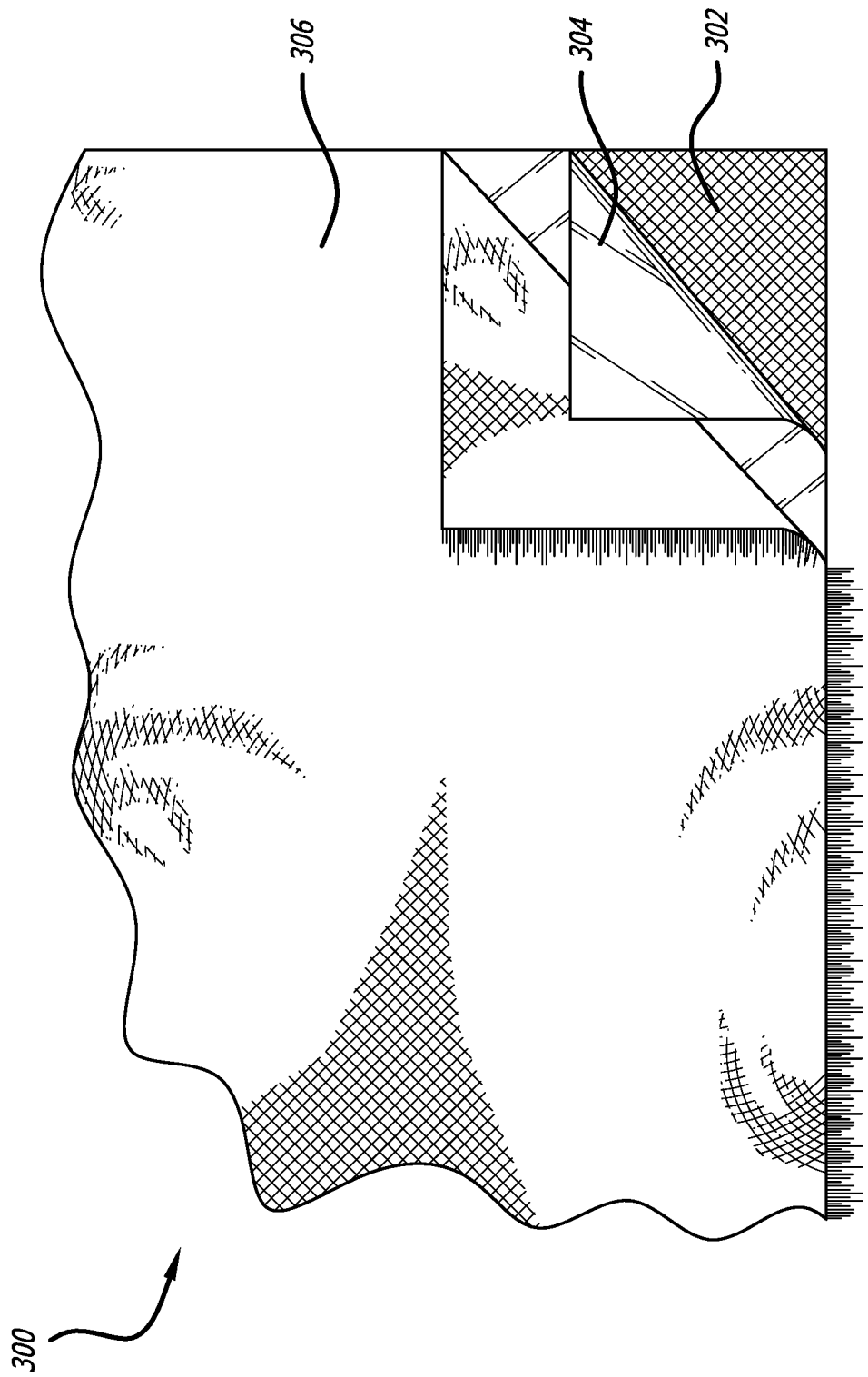
FIG. 3B is a bottom perspective view of the exemplary sample of the second multilayer material of FIG. 3A.

FIG. 3B is a bottom perspective view of the exemplary sample of the second multilayer material 300 of FIG. 3A. A corner of the second multilayer material 300 has been peeled apart for the purposes of this illustration, to show the relationship between the first-material 302, second-material 304, and third-material 306. Bonding or glue layers (not shown) between the various layers are not illustrated to avoid cluttering the drawing.

Figure 4A:
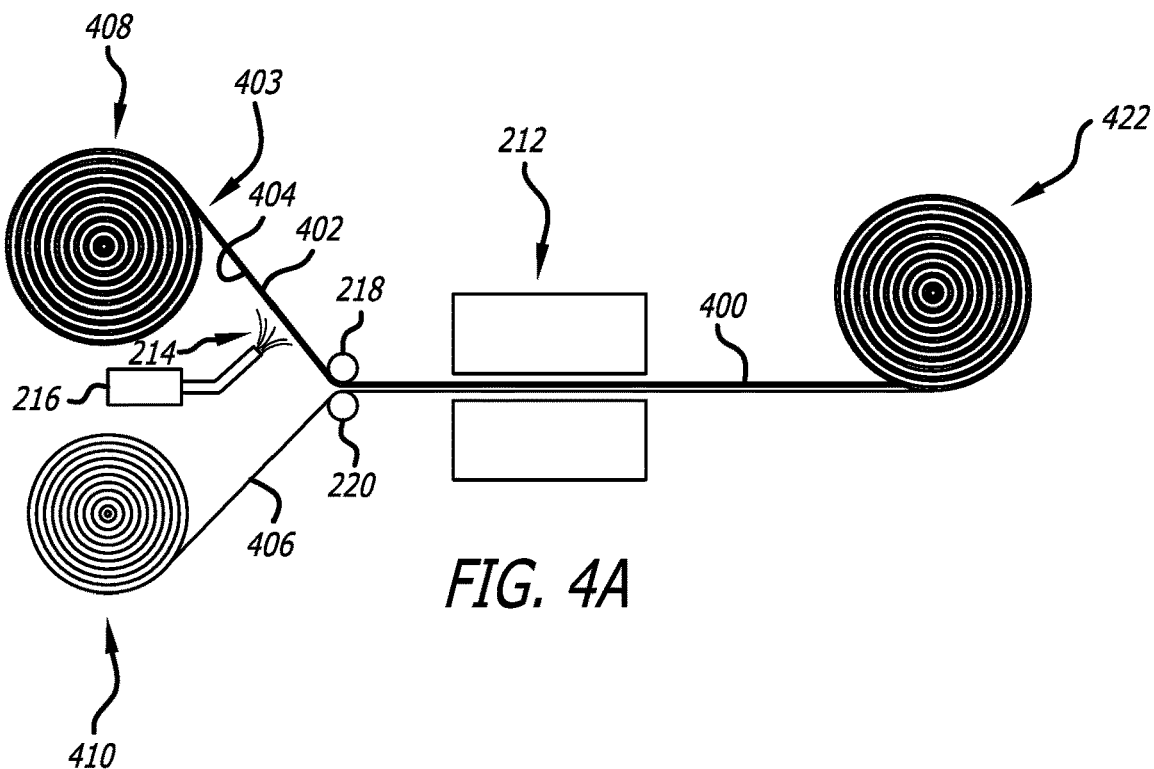
FIG. 4A is a simplified graphical depiction of a set of machines that may be used to bond opposing faces of pre-manufactured multilayer material to an inner material to form a second multilayer material (e.g., a three-layer material), according to aspects described herein.

The second multilayer material 300 (e.g., three-layer material) may be formed using a process that is the same or similar as the process used to make the first multilayer material 100 (e.g., two-layer material), except that the first-material 102 of FIGS. 1A, 1B, 2 is replaced by the pre-manufactured multilayer material 403, FIG. 4A (e.g., a two-layer material comprised of an outer material 402 and an intermediate material 404), while the second-material 104 is replaced with an inner material 406. The process will not be repeated here, to avoid redundancy.

FIG. 4A is a simplified graphical depiction of a set of machines that may be used to bond opposing faces of pre-manufactured multilayer material 403 and inner material 406 to form a second multilayer material 400 (e.g., three-layer material), according to aspects described herein. The second multilayer material 400 may be similar to the second multilayer material 300 of FIGS. 3A and 3B.

As depicted in FIG. 4A, the pre-manufactured multilayer material 403 (e.g., an outer material 402 made of a knitted or woven fiber, thread, or filament, such as a knitted or woven fabric made from polyester, nylon, or cotton fiber, thread, or filament) already bonded to an intermediate material 404 of TPU film) and inner material 406 (e.g., an inner material 406 made of a knitted or woven fiber, thread, or filament, such as a knitted or woven fabric made from polyester, nylon, or cotton fiber, thread, or filament)) may each be provided as rolled stock. The outer material 402 may be different from the inner material 406. A first roll 408 of the pre-manufactured multilayer material 403 and a second roll 410 of the inner material 406 are depicted. Although the pre-manufactured multilayer material 403 and inner material 406 are shown as rolled stock, this is by way of example only and the pre-manufactured multilayer material 403 and/or the inner material 406 may be provided in any form known in the art, such as, but not limited to, sheet form. The second multilayer material 400 may be rolled into/onto roll 422, or stored in any other way as known in the art.

The materials depicted in FIG. 4A may be the same or similar to those described in connection with FIGS. 2-5; to avoid duplication, descriptions of like-numbered materials will not be repeated. Likewise, the set of machines depicted in FIG. 4A may be the same or similar to those described in connection with FIG. 2A; to avoid duplication, descriptions of like-numbered machines will not be repeated.

Figure 4B:
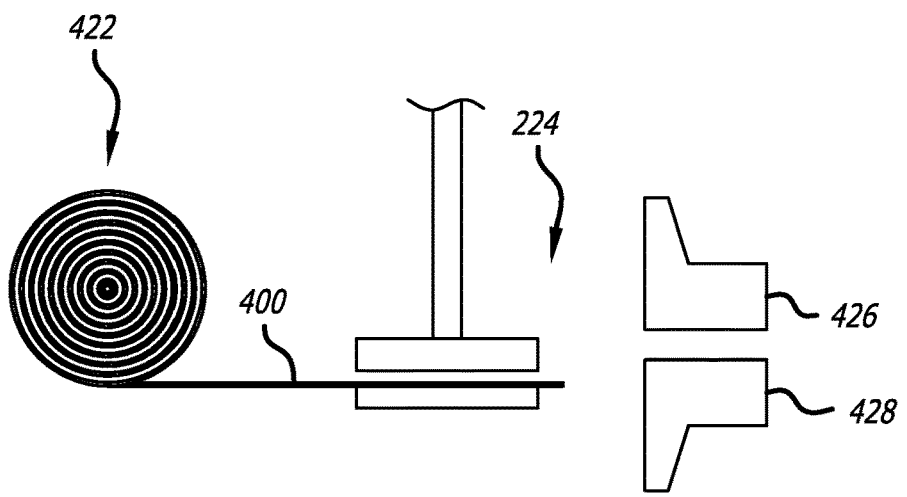
FIG. 4B is a simplified graphical depiction of a die-cutting machine that may be used to cut the second multilayer material into a plurality of multilayer panels (e.g., pattern pieces) that may be used, for example, to form a cover as described herein.

FIG. 4B is a simplified graphical depiction of a die-cutting machine 224 that may be used to cut the second multilayer material 400 into a plurality of multilayer panels (e.g., pattern pieces) that may be used, for example, to form a cover as described herein. According to one method, second multilayer material 400 (e.g., three-layer material) may be fed into the die-cutting machine 224. According to certain aspects, the die-cutting machine 224 may be fed with any type of material including first multilayer material 100, second multilayer material 300, or any multilayer material having two of more layers. The operations of the die-cutting machine 224, and the panels of multilayer material it may produce, are the same or similar to those described with respect to FIG. 2B, except that in FIG. 4B, second multilayer material 400 (e.g., three-layer material) is stored on roll 422 and fed into the die-cutting machine 224 to produce articles of manufacture of multilayer panels 426, 428 (e.g., three-layer panels), while in FIG. 2B first multilayer material 100 (e.g., two-layer material) is stored on the roll 222 and fed into die-cutting machine 224 to produce articles of manufacture including multilayer panels 226 and 228 (e.g., two-layer panels). Other multilayer panels (such as multilayer panes with two or more layers) may be produced by the die-cutting machine 224.

The materials depicted in FIG. 4B may be the same or similar to those described in connection with FIGS. 3A, 3B, and 4A; to avoid duplication, descriptions of like-numbered materials will not be repeated. Likewise, the set of machines depicted in FIG. 4B may be the same or similar to those described in connection with FIG. 2B; to avoid duplication, descriptions of like-numbered machines will not be repeated.

Figure 5:
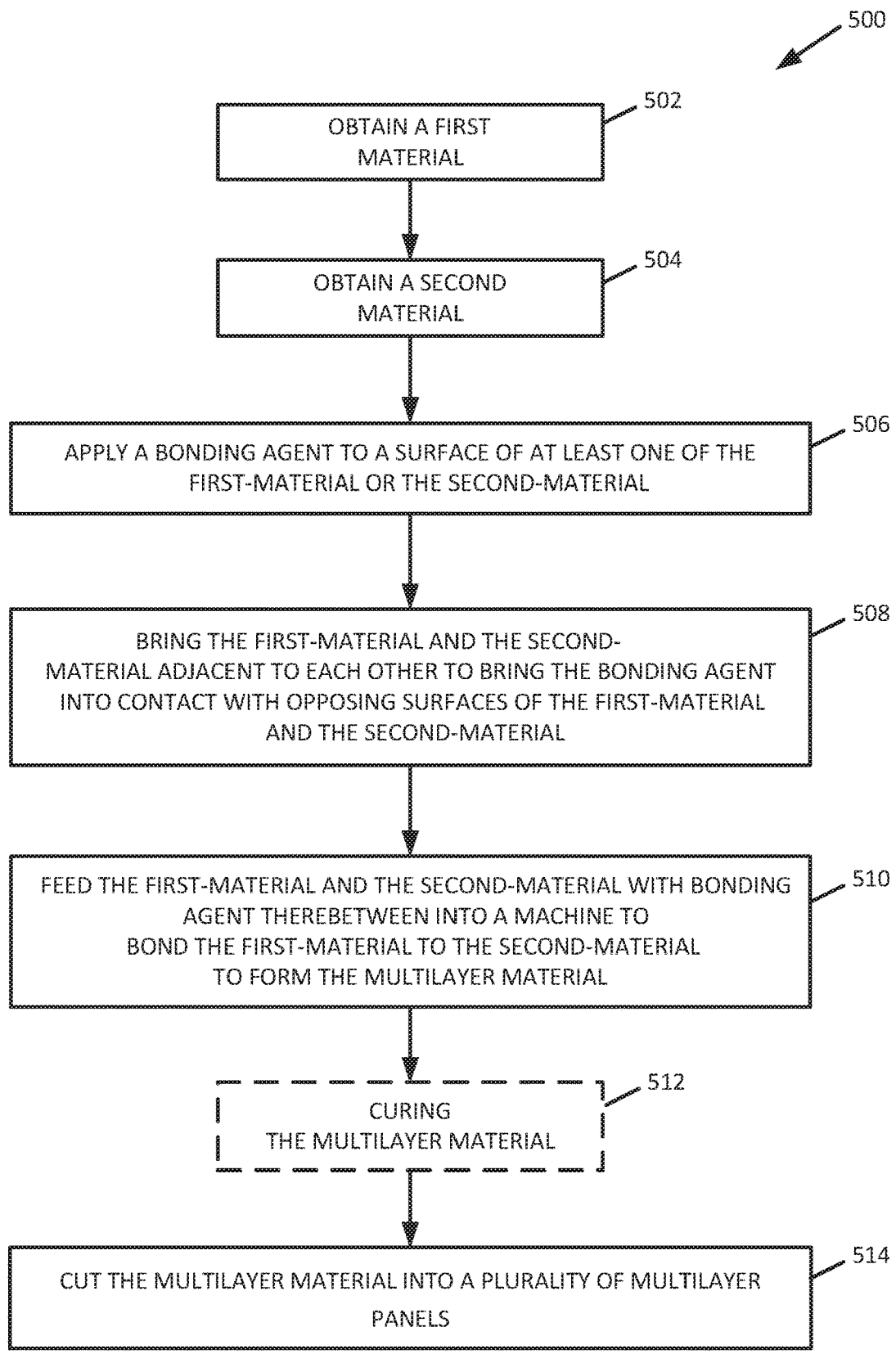
FIG. 5 is flowchart of an exemplary method of making a multilayer material, according to aspects described herein.

FIG. 5 is flowchart of an exemplary method 500 of making a multilayer material according to aspects described herein. The multilayer material may be exemplified by first multilayer material 100 (FIGS. 1A, 1B, 2A, 2B) and second multilayer material 300 (FIG. 3A, 3B), pre-manufactured multilayer material 403 (FIG. 4A), and second multilayer material 400 (FIG. 4A, 4B). In an aspect, the exemplary method 500 may include obtaining a first-material 502 and obtaining a second-material 504. The first-material and the second-material may be obtained in any order. The exemplary method 500 may further include applying a bonding agent to a surface of at least one of the layers of the first-material or the second-material 506. The exemplary method 500 may also include bringing the first-material and the second-material adjacent to each other to bring the bonding agent into contact with opposing surfaces of the first-material and the second-material 508. The exemplary method 500 may still further include feeding the first-material and the second-material with bonding agent therebetween into a machine to bond the first-material to the second-material to form the multilayer material 510. As an optional step, in the event additional time or ways to cure the multilayer material (e.g. 100, 300, 403, 400) are required or desired, the method may include curing the multilayer material 512. The exemplary method 500 may also include cutting the multilayer material into a plurality of multilayer panels 514.

According to some aspects, the machine may use at least one of pressure, heat, or microwave energy to bond the first-material to the second-material and form the multilayer material. According to some aspects, the machine may be a laminating machine and the multilayer material may be a multilayer laminated material.

According to some aspects, the first-material may be configured to face an exterior space that is exposed to weather and the second-material may be configured to face an interior space sheltered from the weather, the first-material being different from the second-material. In some examples, the second-material may be a thermoplastic polyurethane (TPU) film (e.g., a TPU film, a TPU sheet). According to some examples, first-material may be a fabric, such as a knitted or woven fabric made from a knitted or woven fiber, thread, or filament. According to some examples, the first-material may be a fabric and the second-material may be a thermoplastic polyurethane (TPU) film, and the multilayer material may be a two-layer material.

According to other aspects, the first-material may be a pre-manufactured multilayer material comprised of at least two-layers of different materials and the second-material may be different from at least one layer of the pre-manufactured multilayer material. The at least one layer of the pre-manufactured multilayer material may be disposed between (e.g., sandwiched between) an outer layer of the multilayer material and an inner layer of the multilayer material. The outer layer of the multilayer material may be configured to face an exterior space that is exposed to weather, while the inner layer of the multilayer material may be configured to face an interior space sheltered from the weather. In some examples, the at least one layer of the pre-manufactured multilayer material is a layer of thermoplastic polyurethane (TPU) film (e.g., a TPU film, a TPU sheet). According to one example, the pre-manufactured multilayer material may be referred to as the first-material and the first-material may be comprised of a first fabric bonded to a thermoplastic polyurethane (TPU) film, and the TPU film may be disposed between the first fabric and the second-material, and the multilayer material that is formed may be a three-layer material. According to some aspects, at least one of the first fabric or the second-material may be a knitted or woven fabric made from a knitted or woven fiber, thread, or filament.

Thermoplastic Polyurethane (TPU)

TPU was first developed in 1937 and is a material renowned for many things including its: high elongation and tensile strength; its elasticity; and to varying degrees, its ability to resist oil, grease, solvents, chemicals and abrasion. A special property of TPU is its segmented structure, which is comprised of hard segments (HSs) and soft segments (SSs). As the temperature rises, the soft segments expand, and tiny pores are formed on the membrane allowing water molecules to pass through. In cold weather, however, the soft segments tighten up closing the pores. Consequently, the strength and the insulation properties of the material increases dramatically helping to keep the wind and dirt from passing through the cover which in turn extends the life of the cover as water and wind (for example tearing) damage is minimized.

Combined Vent/Ventilation Cover/Handle

Figure 6:
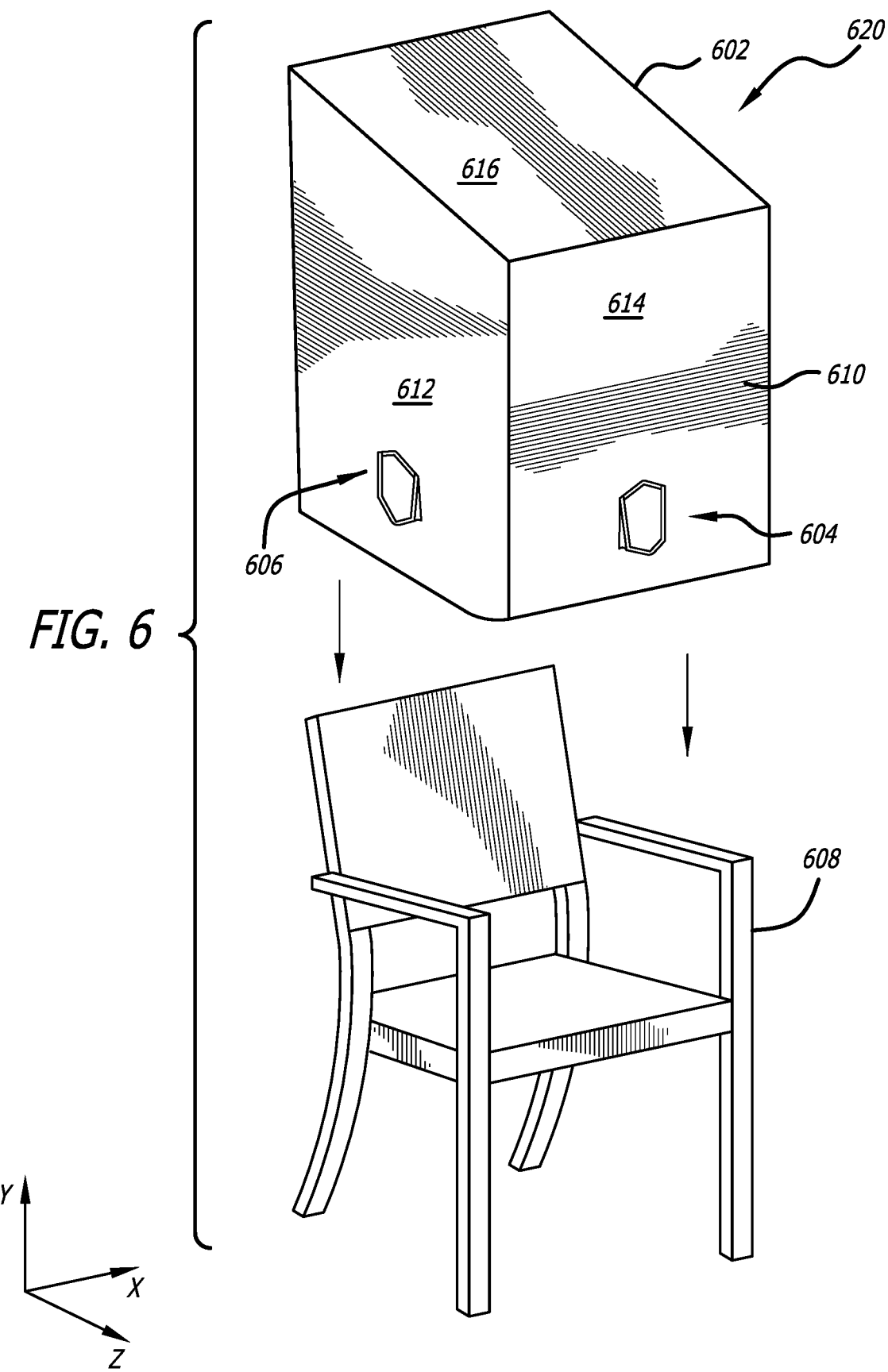
FIG. 6 is a perspective view of an exemplary cover for an object used outdoors, according to examples described herein.

FIG. 6 is a perspective view of an exemplary cover 602 for an object 608 used outdoors, according to examples described herein. As used herein, a pocket having a downward facing entrance (e.g., opening, mouth) may be considered as a handle. In some aspects, the combined vent/ventilation cover may be described as a multi-function handle and ventilation feature. In some aspect, a pocket having a downward facing entrance may resemble an upside-down shirt pocket. An example of the object 608 used outdoors is provided as a piece of furniture, in this example, a chair. The cover 602 may be comprised of a plurality of multilayer panels that, when fixed together, form the cover 602. Each of the multilayer panels may be formed from multilayer material such as the multilayer material (e.g., multilayer material 100, 300, 400, and/or 403) described above. The cover 602 divides an exterior space that is exposed to weather from an interior space sheltered from the weather, the cover 602 may be configured to receive the object 608 (e.g., chair) within the interior space. A ventilation cover 604 and second ventilation cover 606 may each cover a ventilation opening (e.g., 720, FIG. 7) in a first panel of the plurality of multilayer panels. For example, ventilation cover 604 may cover a ventilation opening (720, FIG. 7) in the first multilayer panel 610. As used herein, the ventilation opening (720, FIG. 7) may be considered as a vent, according to aspects described herein.

A three-axis coordinate (x, y, z) system is depicted with FIG. 6 and is also depicted with additional figures herein. In general, the x-axis is used to represent the horizontal and right/left references (where right is generally toward increasing values of x and left is generally toward decreasing values of x), the y-axis is used to represent the vertical, up/down, or top/bottom references (where up or top is generally toward increasing values of y and down or bottom is generally toward decreasing values of y), and the z-axis is used to represent depth and inward/outward references (where inward (e.g., toward an interior of the cover 602) is generally toward decreasing values of z and outward (e.g., away from the interior of the cover 602) is generally toward increasing values of z). Additionally, a first component/panel/piece that is proximal to a given surface is closer to the given surface than a second component/panel/piece that is distal to the given surface.

For ease of reference only, discussion herein is referenced to a first multilayer panel 610 of the plurality of multilayer panels of the cover 602. Although the first multilayer panel 610 is depicted as the front side 614 of the cover 602, the first multilayer panel 610 could just as easily be the left side 612, the right side (not visible), or the backside (not visible) of the cover 602. In the discussion that follows, an exemplary ventilation cover may be referred to as ventilation cover 604. The ventilation cover 604 may be coupled to an exterior surface of the first multilayer panel 610 of the cover 602. For purposes of reference, the first multilayer panel 610 will be understood to be oriented substantially vertically, parallel to the x-y plane. References to right, right side, left, left side, top, over, above, bottom, below, under, proximal, and distal will all be understood in light of the preceding remarks.

As depicted in FIG. 6, the cover 602 is illustrated as being above the object 608 (e.g., chair). The cover 602 is shown in a position from which the cover 602 may be brought downward to enclose the object 608 within the interior space sheltered from the weather.

The exemplary embodiment of FIG. 6 illustrates a ventilation cover 604 on a first side (e.g., front side) of the cover 602 and second ventilation cover 606 on a second side (e.g., left-side) of the cover 602. Two ventilation covers are shown for exemplary and non-limiting purposes only. There may be one or more ventilation covers on a cover 602. Additionally, ventilation cover 604 and second ventilation cover 606 are shown as having the same shape and size for exemplary and non-limiting purposes only. When a plurality of ventilation covers is present on a cover 602, the shape and size of at least one of the plurality of ventilation covers may be the same or different from the shape and size of one or more of the remaining plurality of ventilation covers. According to one aspect, ventilation cover 604 may be used as, or in connection with, a ventilation opening/ventilation system of the cover 602. The ventilation cover 604, or more specifically, one or more pockets as described herein formed by the ventilation cover, may also serve as one or more handles that may be used to lift the cover 602 from the object 608 (e.g., chair) which it is protecting from weather.

Figure 7:
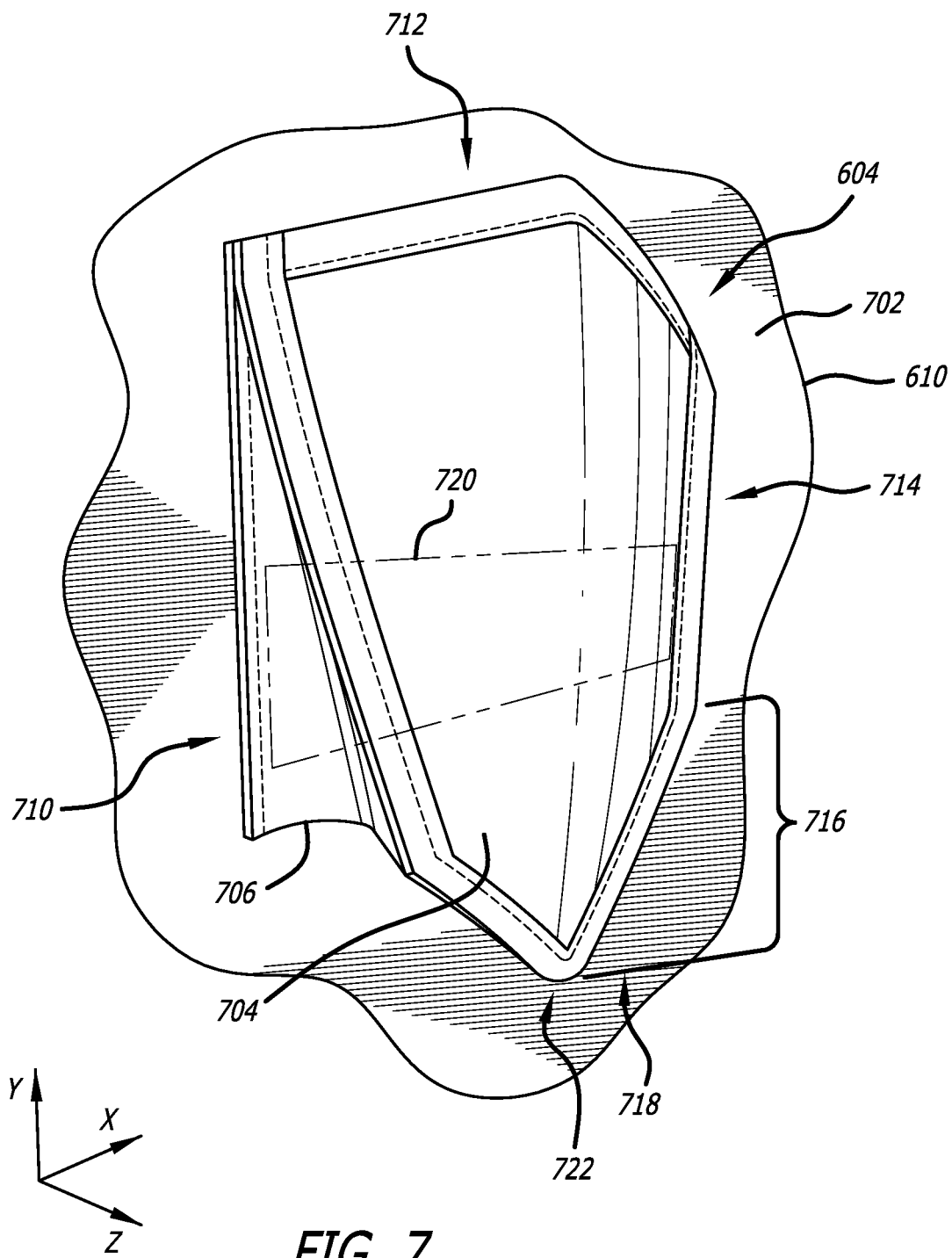
FIG. 7 is a front left perspective view of a ventilation cover of FIG. 6 coupled to an exterior surface of the first panel of the cover, according to aspects described herein.

FIG. 7 is a front left perspective view of the ventilation cover 604 of FIG. 6 coupled (e.g., fixed directly or indirectly) to an exterior surface 702 of a cover 602, according to aspects described herein. The shape of the ventilation cover 604 (e.g., a shield-shape) is exemplary and non-limiting. The ventilation cover 604 and/or the front panel 704 may have any shape, so long as the shape covers the ventilation opening 720. The exterior surface 702 may be, for example, an outer surface of a first-material 102 of a multilayer material, such as first multilayer material 100 (e.g., two-layer material), pre-manufactured multilayer material 403 (e.g., two-layer material), second multilayer material 300 (e.g., three-layer material), or second multilayer material 400 (e.g., three-layer material) as described herein. Other multilayer materials of at least two layers are within the scope of the disclosure. To avoid cluttering the drawing, the directional arrows 710, 712, 714, and 718 perform multiple duties, for example, they identify the left edge 710, top edge 712, right edge 714, and bottom edge 718 of the front panel 704, identify the left edge 710, top edge 712, right edge 714, and bottom edge 718 of the ventilation opening 720, identify the left panel bottom edge 718 of the left panel 706 and the right panel bottom edge 718 of the right panel 708.

The ventilation cover 604 may include a front panel 704 coupled, along a portion of the left edge 710 of the front panel 704 to left panel 706 and along a portion of the right edge 714 of the front panel 704 to a right panel 708 (not visible in figure). The right panel 708 is not visible from the perspective view of FIG. 7. The left panel 706, right panel 708 (not shown), and top-edge of the front panel 704 may be coupled to the exterior surface 702 of the first multilayer panel 610. Coupling may be, for example, by sewing, riveting, or bonding.

According to one example, the left panel 706 and right panel 708 may each be oriented vertically, along the y-axis, and may be parallel to each other. When so oriented, a distance, along the x-axis, between the left panel 706 and right panel 708 may correspond to a width of the ventilation cover 604. However, in some examples, the left panel 706 and right panel 708 may not be parallel, in which case the width of the ventilation cover 604 may vary along the Y-axis.

The overall length (e.g., along the y-axis) of the front panel 704 is such that it is longer than the lengths (e.g., along the y-axis) of the lengths of the left panel 706 and right panel 708 (which according to one exemplary aspect share a common length). The front panel 704 may extend downward, past the bottom-most edges of the left panel 706 and right panel 708. The portion of the front panel 704 that extends past the bottom-most edges of the left panel 706 and right panel 708 may form a flap 716 that may be configured to fold back to be adjacent to an outside surface of the front panel 704, where the fold is substantially along an imaginary line extending between the bottom-most edges of the left panel 706 and right panel 708. For example, with reference to FIG. 12, the imaginary line is drawn into the page, along the x-axis, and the imaginary line would be at the folding point just past the bottom edge 1206 of right panel 708.

A first pocket 722 having as a proximal wall formed by a portion of the first multilayer panel 610 adjacent to and including the ventilation opening 720, and a distal wall, adjacent to the proximal wall and covering the ventilation opening 720, formed by the front panel 704 coupled to the portion of the first multilayer panel 610 adjacent to (e.g., and spaced apart from) a perimeter of the ventilation opening 720, for example at the left edge 710, top edge 712, and right edge 714 of the ventilation opening 720 and providing a first pocket 722 having a downward facing entrance (e.g., opening, mouth) configured to remain open (in some examples, at all times). The first pocket 722, from the first pocket 722 entrance to the ventilation opening 720, permits airflow through the ventilation opening 720 between the exterior space (external to the cover 602) and the interior space (within the cover 602).

Figure 12A:
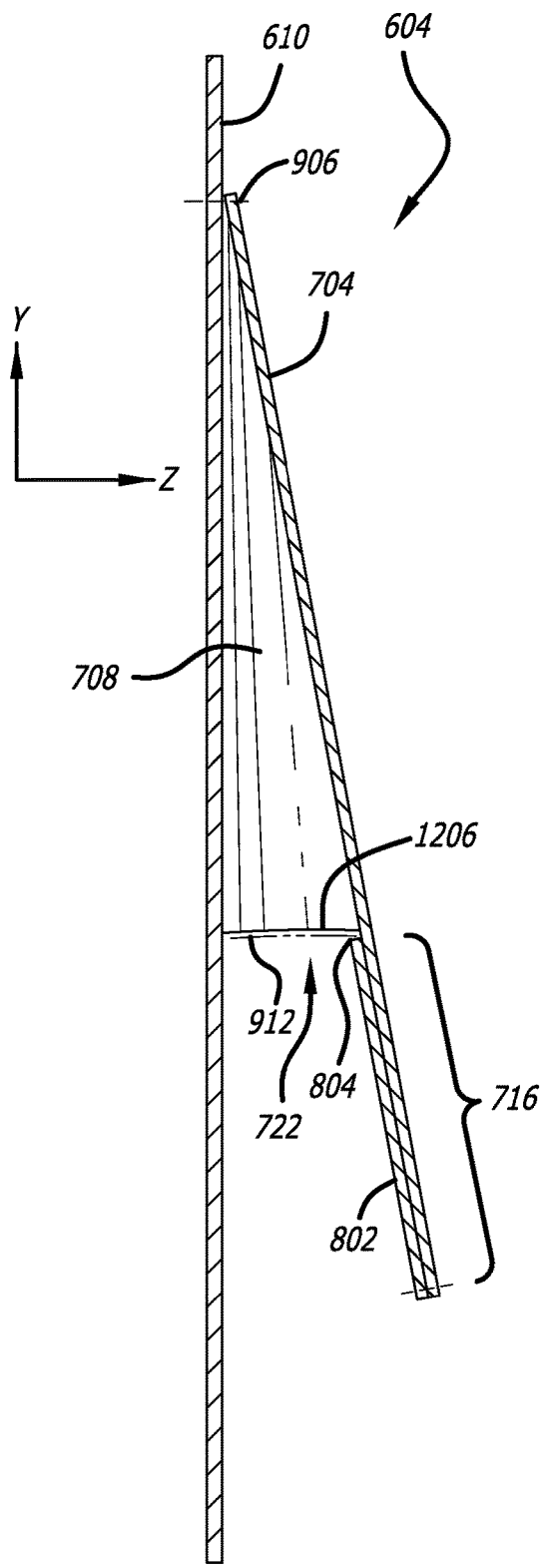
FIG. 12A is a cross-sectional view, taken in a vertical (x-z) plane, of the ventilation cover of FIG. 7, according to aspects described herein.

A sub-panel (802, FIG. 8B) (hidden from view in FIG. 7) may be fixed to the flap 716 on a side of the front panel 704 that faces the exterior surface 702 of the first multilayer panel 610. FIG. 12A depicts the flap 716 in a relaxed state and pointed substantially down. In the exemplary illustration of FIG. 12A and FIG. 12B, the sub-panel 802 is fixed to the flap 716.

Figure 8A:
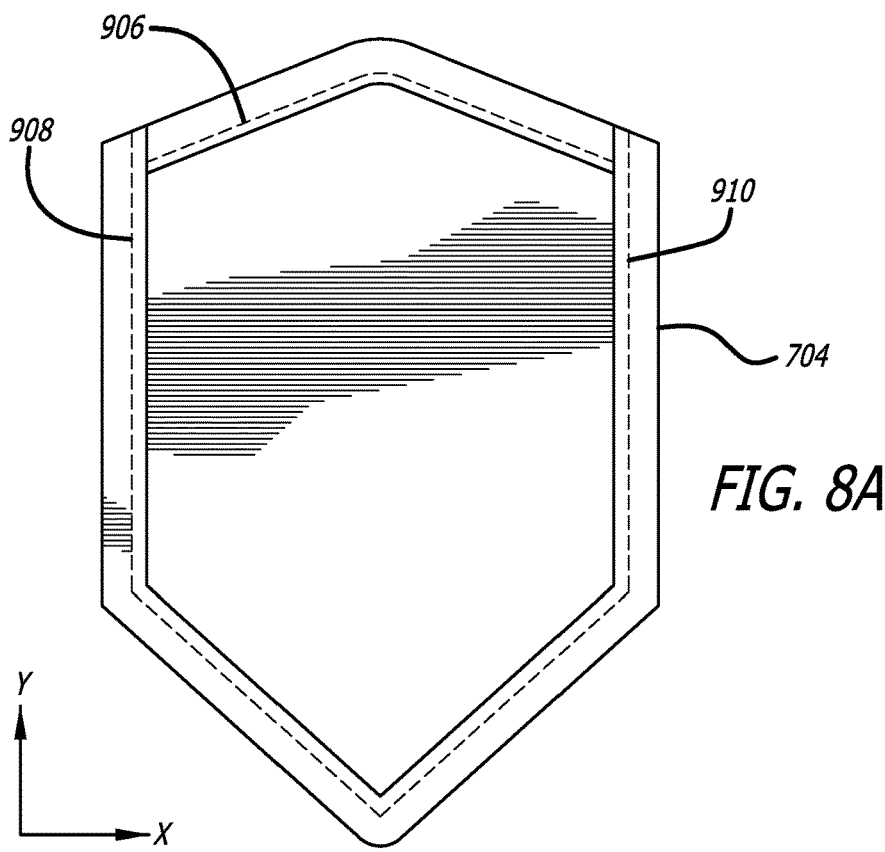
FIG. 8A is a front view of the front panel of FIG. 7.
Figure 8B:
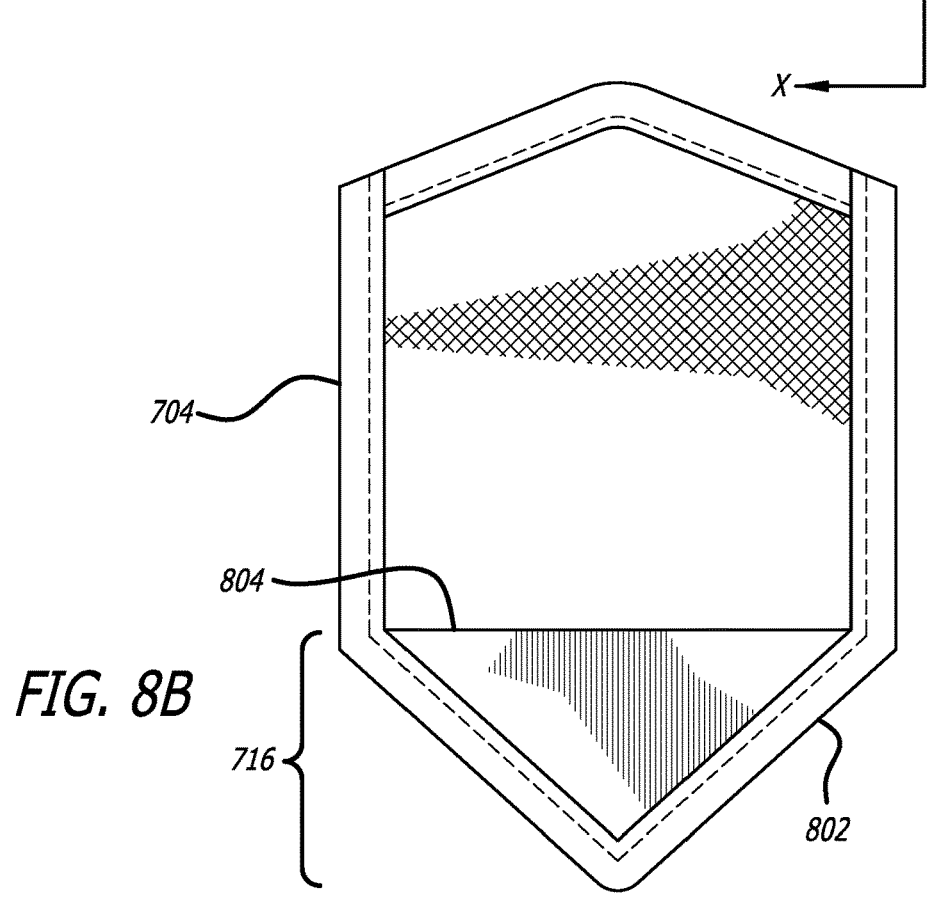
FIG. 8B is a rear view of the front panel and a sub-panel of the front panel of FIG. 7.

FIG. 8A is a front view of the front panel 704 of FIG. 7. FIG. 8B is a rear view of the front panel 704 of FIG. 7. The sub-panel 802 may be fixed to the rear side of the front panel 704 at a bottom of the front panel 704, for example in the flap 716 area of the front panel 704. According to some examples, the shape of the sub-panel 802 may substantially correspond to the shape of the flap 716 of the front panel 704 (which it covers), as shown in FIG. 8; however, this shape is only exemplary and other shapes are within the scope of the disclosure.

The sub-panel 802 may be fixed to the front panel 704 at the bottom edge(s) of the front panel 704. A top edge 804 of the sub-panel 802 is not fixed to the front panel 704, so that a second pocket 1202 (FIG. 12) is formed between opposing surfaces of the front panel 704 and the sub-panel 802. The edges (e.g., perimeter) of the second pocket 1202 (FIG. 12) may be defined as the edges that are fixed to the front panel 704 and the top edge 804 of the sub-panel 802. In the example of FIG. 8B, the sub-panel 802 is triangular, so the bottom left, and bottom right edges of the triangle may be fixed to the front panel 704. However, other shapes of the sub-panel 802 are within the scope of the disclosure.

Figure 9:
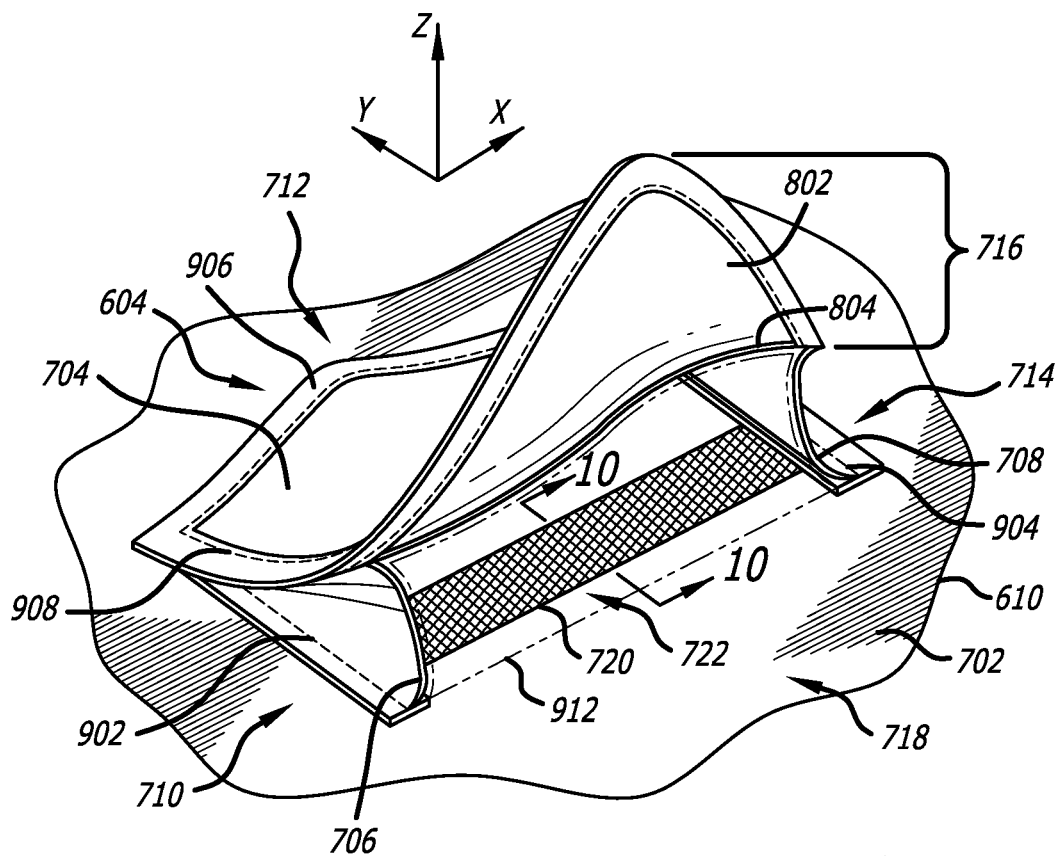
FIG. 9 illustrates a bottom left perspective view (looking upward from a lower left vantage point) of a ventilation cover coupled to an exterior surface of a first multilayer panel of the cover of FIG. 6, according to aspects described herein.

FIG. 9 illustrates a bottom left perspective view (looking upward from a lower left vantage point) of a ventilation cover 604 coupled to an exterior surface 702 of the first multilayer panel 610 of the cover 602 of FIG. 6, according to aspects described herein. In FIG. 9, the viewer is below the ventilation cover 604 and looking upward into a first pocket 722 formed by the front panel 704, the left panel 706, the right panel 708, and the exterior surface 702 of the first multilayer panel 610 of the cover 602 opposite to the front panel 704. The flap 716 of the front panel 704 is illustrated, for exemplary purposes, as being folded outward (along the z-axis) from remaining portion of the front panel 704. As illustrated, the flap 716 lies substantially in an x-z plane substantially perpendicular to the first multilayer panel 610. The sub-panel 802 is shown on the inside of the flap 716. As previously described, the sub-panel 802 is fixed along its bottom edges (or bottom and side edges, depending on the shape of the sub-panel 802) to flap 716 of the front panel 704 on the inside of the front panel 704. A top edge 804 of the sub-panel 802 is not fixed to the front panel 704, to allow the top edge 804 to be extended away from the flap 716 portion of the front panel 704 to reveal a second pocket 1202 (FIG. 12) formed between the opposing surfaces of the sub-panel 802 and the front panel 704.

According to some aspects, the first pocket 722 may be defined at its proximal sides (e.g., left and right sides proximal to first multilayer panel 610) by seam 902 and seam 904 joining each of the left panel 706, right panel 708, and first multilayer panel 610 along edges of the left panel 706 and right panel 708 that are fixed to the first multilayer panel 610, and at its top by seam 906 between the front panel 704 and the first multilayer panel 610 along the top edge 712 of the front panel 704. The first pocket 722 may be defined at its distal sides (e.g., left and right sides distal to first multilayer panel 610) by seam 908 and seam 910 (FIG. 8A) joining each of the left panel 706, right panel 708, and first multilayer panel 610 along edges of the left panel 706 and right panel 708 that are fixed to the front panel 704, and at its top by seam 906 between the front panel 704 and the first multilayer panel 610 along the top edge 712 of the front panel 704. A first pocket entrance 912 (e.g., opening, mouth) is shown in broken line as a polygon. Although the accompanying drawings illustrate seams as being "stitched," this is for ease of illustration and for exemplary and non-limiting purposes. As used herein, the word "seam" may mean a line along which two or more pieces of material are bonded together, for example, by sewing, epoxying, gluing, melting, or any way other way known in the art.

Figure 10:
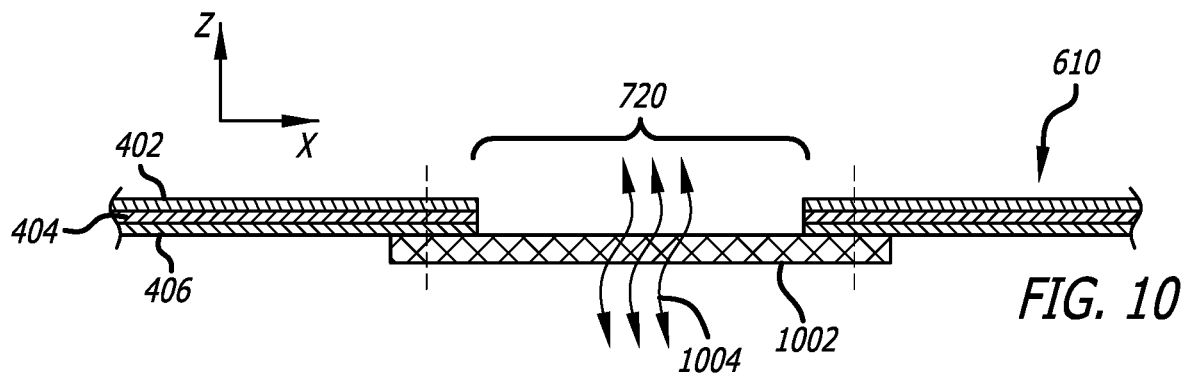
FIG. 10 is a cross-sectional view taken along lines 10-10 in FIG. 9.

FIG. 10 is a cross-sectional view taken along line 10-10 in FIG. 9. An airway may be formed by the ventilation opening 720. The ventilation opening 720 may be defined by edges of the first multilayer panel 610 at the perimeter of the ventilation opening 720. As depicted, the ventilation opening 720 may be within the first pocket 722 and may be covered by the front panel 704. A feature 1002 (e.g., a mesh material, a net material, a screen material) fixed to the first multilayer panel 610 adjacent to and surrounding the ventilation opening 720 that allows air to flow bidirectionally 1004 through the ventilation opening 720 while preventing debris and insects from entering an inner area within the confines of the cover 602 through the ventilation opening 720. Any type (e.g., mesh, net, screen) of material having suitable interstitial space as known in the art may be used. Although shown in a rectangular shape, the ventilation opening 720 is not limited by the exemplary shape; any shape suitable for use as a ventilation opening 720 may be used. Additionally, although one opening (e.g., ventilation opening 720) is shown, a plurality of openings is within the scope of this disclosure.

With reference to FIGS. 6, 7, 8, and 9, according to some aspects, a plurality of multilayer panels (including first multilayer panel 610) may, when fixed together, form a cover 602, wherein the cover 602 divides an exterior space that is exposed to weather from an interior space sheltered from the weather, wherein the cover 602 is configured to receive an object 608 (e.g., chair) within the interior space.

A ventilation opening 720 in the may be formed in first multilayer panel 610 of the plurality of multilayer panels. The ventilation opening 720 may be defined by left, top, right, and bottom edges of the first multilayer panel 610 that define a perimeter of the ventilation opening 720. A ventilation cover 604 may be coupled to an exterior surface 702 of the first multilayer panel 610, adjacent to (e.g., and spaced apart from) right, top, and left edges of the ventilation opening 720. According to one aspect, the ventilation cover 604 shields the ventilation opening 720 from the weather in the exterior space while maintaining airflow through the ventilation opening 720 between the exterior space and the interior space. The plurality of multilayer panels, including the first multilayer panel 610, may be fixed to each other to form the cover 602.

According to one aspect, the ventilation cover 604 may include: a front panel 704 having a left edge 710, a right edge 714, a top edge 712, and a bottom edge 718; a left panel 706 having a left panel proximal edge and a left panel distal edge relative to the exterior surface 702 of the first multilayer panel 610 and a left panel top edge and a left panel bottom edge 718; and a right panel 708 having a right panel proximal edge and a right panel distal edge relative to the exterior surface 702 of the first multilayer panel 610 and a right panel top edge and a right panel bottom edge 718. The left panel distal edge of the left panel 706 is fixed to the left edge 710 of the front panel 704, the right panel distal edge of the right panel 708 is fixed to the right edge 714 of the front panel 704, the bottom edge 718 of the front panel 704 extends past the left panel bottom edge 718 of the left panel 706 and the right panel bottom edge 718 of the right panel 708 to form a flap 716 that is configured to fold back to be adjacent to an outside (distal) surface of the front panel 704, where the left panel proximal left edge 710 of the left panel 706, the top edge 712 of the front panel 704, and the right panel proximal right edge 714 of the right panel 708 are fixed to the first multilayer panel 610 along a seam 902, 906, 904, respectively, adjacent to (e.g., and spaced apart from) the left edge 710, top edge 712, and right edge 714 of the ventilation opening 720.

According to some aspects, the ventilation cover 604 may form a first pocket 722 having as a proximal wall, a portion of the first multilayer panel 610 adjacent to and including the ventilation opening 720, and as a distal wall, adjacent to the proximal wall and covering the ventilation opening 720, a front panel 704 coupled to the portion of the first multilayer panel 610 along a seam (902/906/904 and/or 908/906/910) adjacent to (e.g., and spaced apart from) the left edge 710, top edge 712, and right edge 714 of the ventilation opening 720 and providing a first pocket 722 having a downward facing first pocket entrance 912 configured to remain open (in some aspects remain permanently open), where the first pocket 722, from the first pocket entrance 912 to the ventilation opening 720, permits airflow through the ventilation opening 720 between the exterior space and the interior space.

According to one example, the front panel 704 extends downward, past bottom left and right edges of the seam 902, 904, (or alternatively, past the bottom edges of the left panel 706 and the bottom edge 1206 (FIG. 12A, 12B) of the right panel 708) to form a flap 716 that is configured to fold back to be adjacent to an outside surface (e.g., a distal surface) of the front panel 704 substantially along a line joining bottom left and right edges of the seam 902, 904 (or alternatively, past the bottom edges of the left panel 706 and the right panel 708). In one example, the fold 1208 is substantially along an imaginary line extending between the bottom edge (not visible) of the left panel 706 and the bottom edge 1206 of the right panel 708. For example, with reference to FIG. 12, the imaginary line is drawn into the page, along the x-axis, and the imaginary line would be at the folding point just past the bottom edge 1206 of the right panel 708

According to one aspect, the cover 602 may further include a second pocket 1202 comprised of a sub-panel 802 fixed to the flap 716 along left, bottom, and right edges of the flap 716, below the line joining the bottom left and right edges of the seam on a side of the flap 716 that opposes the front panel 704 when the flap 716 is pointed down, where the second pocket 1202 presents a second pocket entrance 1204 that is downward facing and that lies in substantially a same horizontal plane as the first pocket entrance 912, when the flap 716 is folded back to be adjacent to the outside surface of the front panel 704.

When the flap 716 is folded back on itself (to be adjacent to an outer surface of the front panel 704), the second pocket entrance 1204 may be configured to receive one or more fingers of a hand 1102 (FIG. 11) and receive an upward force, propagated through the one or more fingers of the hand 1102 (FIG. 11) to the second pocket 1202, to lift the cover 602 over the object.

Figure 11:
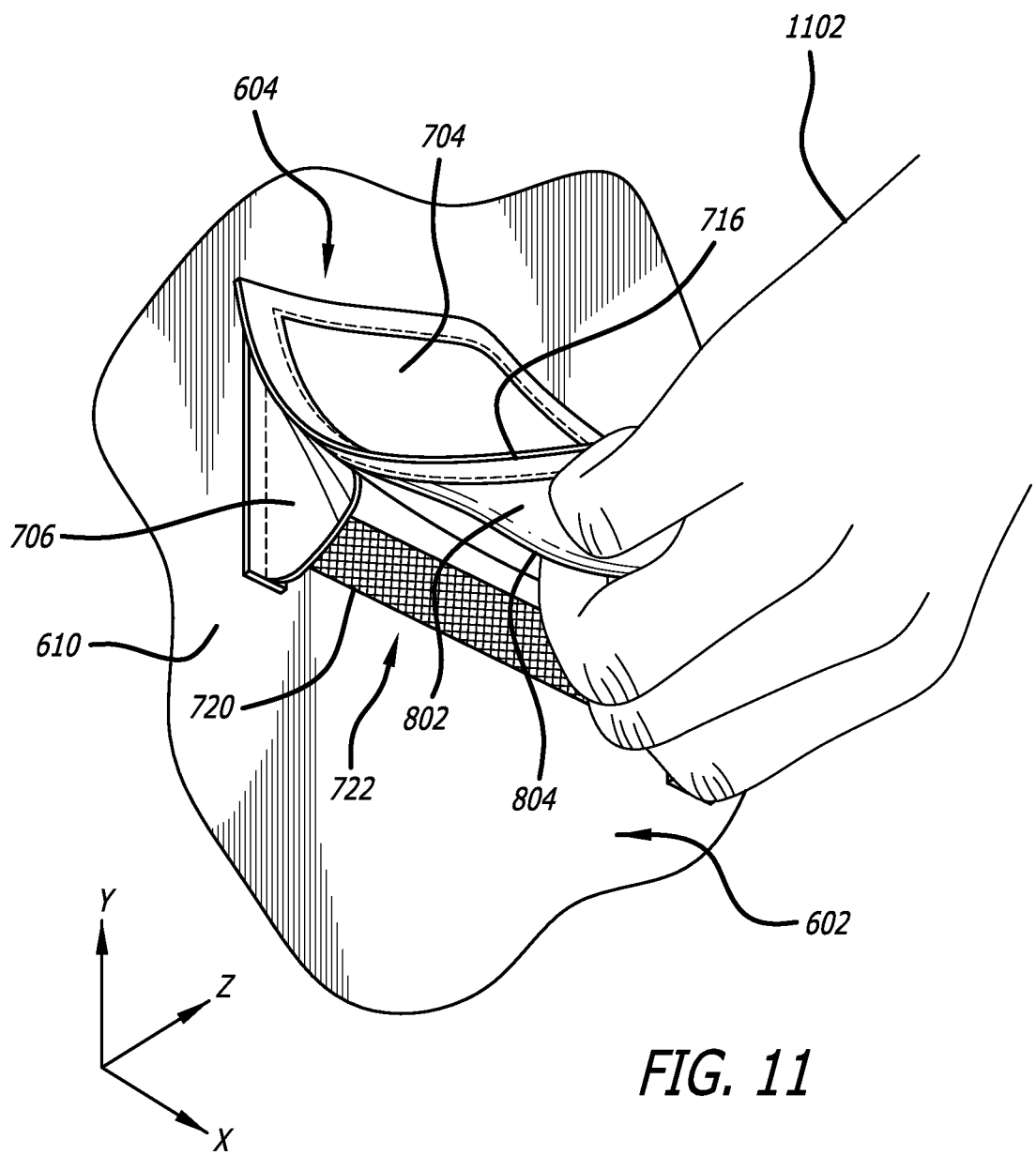
FIG. 11 is a bottom left perspective view of a ventilation cover coupled to a portion of a first multilayer panel, according to examples described herein.

FIG. 11 is a bottom left perspective view of a ventilation cover 604 coupled to a portion of a first multilayer panel 610, according to examples described herein. The ventilation cover 604 may include a front panel 704 and left panel 706 and right panel 708 (not visible in FIG. 11) all as fixed to each other and to the first multilayer panel 610 as previously described. Also illustrated are a hand 1102, where a portion of one or more fingers of a hand 1102 are within a second pocket 1202 (FIG. 12) formed between facing surfaces of the front panel 704 and the sub-panel 802. The one or more fingers of the hand 1102 (FIG. 11) are depicted as curling around the top edge 804 of a sub-panel 802. The hand 1102 is pulling the flap 716 outward and folding the flap upward from the first multilayer panel 610. The flap 716 is illustrated as being in a substantially horizontal orientation (e.g., substantially lying in the x-z plane). The hand 1102 may continue to lift and fold the flap 716 so that the flap 716 is in a substantially vertical orientation (e.g., substantially lying in the x-y plane). A user (represented by the hand 1102 of a user) may thus use the second pocket 1202 on the inside of the flap 716 to lift the first multilayer panel 610, and thus the cover 602 fixed to the ventilation cover 604, upward. Lifting the cover 602 upward through use of the second pocket 1202 enables a user to insert the one or more fingers of the hand 1102 into the second pocket 1202 and avoid having to insert the one or more fingers of the hand 1102 into the first pocket 722, where, because the first pocket entrance 912 is maintained in an open state, one or more insects may have be waiting, or where an insect may have made a nest in the confines of the first pocket 722; however, but the second pocket 1202 is relatively free from risk of contact with an insect or insect nest because, in its relaxed state (e.g., flap 716 pointed down) insects would not tend to enter the second pocket 1202 as the second pocket entrance 1204 is normally closed (e.g., top edge 804 of sub-panel 802 normally resets against back of front panel 704, thus closing the second pocket entrance 1204.

With reference to FIGS. 6, 7, 8, and 9, according to one aspect, a cover 602 for an object 608 used outdoors (e.g., a chair), may fit over the object 608 and may include including left side 612, right side (not visible in figures), front side 614, back side (not visible in figures), and top side 616. The cover 602 may include a plurality of multilayer panels 620 fixed together to form the cover 602, wherein the cover 602 divides an exterior space that is exposed to weather from an interior space sheltered from the weather, the cover 602 configured to receive the object within the interior space. The cover may include a ventilation opening 720 having a left, top, right, and bottom perimeter in a first multilayer panel 610 of the plurality of multilayer panels 620. According to some aspects, when the cover 602 is fit over the object 608 (e.g., chair), the first multilayer panel 610 is oriented as at least a part of at least one of the left side 612, right side (not visible in figure), front side 614, or back side (not visible in figure) of the cover 602. The ventilation opening 720 may be defined by edges of the first multilayer panel 610 that define the perimeter of the ventilation opening 720. For example, a left edge 710, a top edge 712, a right edge 714, and bottom edge 718 of the ventilation opening 720 may define a perimeter of the ventilation opening 720. The cover 602 may include a first pocket 722 having as a proximal wall, a portion of the first multilayer panel 610 adjacent to and including the ventilation opening 720, and as a distal wall, adjacent to the proximal wall and covering the ventilation opening 720, a front panel 704 coupled to the first multilayer panel 610 along a seam 904, 906, 904 adjacent to (e.g., and spaced apart from) the left, top, and right perimeter of the ventilation opening 720, the first pocket 722 having a downward facing first pocket entrance 912 configured to remain open (in some examples, remain permanently open). The first pocket 722, from the first pocket entrance 912 to the ventilation opening 720, may define walls of a passageway in the exterior space to provide for airflow through the ventilation opening 720 between the exterior space and the interior space. Additionally, the front panel 704 may serve as a handle when lifting the cover 602 from the object 608.

According to some examples, the front panel 704 may extend downward, past bottom left and right edges of the seam 902, 904, 906, to form a flap 716 that is configured to fold back to be adjacent to an outside surface of the front panel 704 substantially along a line joining bottom left and right edges of the seam 902, 904, 906 (or alternatively, past the bottom edges of the left panel 706 and the bottom edge 1206 (FIG. 12A, 12B) of the right panel 708) to form a flap 716 that is configured to fold back to be adjacent to an outside surface (e.g., a distal surface) of the front panel 704 substantially along a line joining bottom left and right edges of the seam 902, 904 (or alternatively, past the bottom edges of the left panel 706 and the right panel 708). In one example, the fold 1208 is substantially along an imaginary line extending between the bottom-most edges of the left panel 706 and right panel 708. For example, with reference to FIG. 12, the imaginary line is drawn into the page, along the x-axis, and the imaginary line would be at the folding point just past the bottom edge 1206 of right panel 708

The cover 602 may further include a second pocket 1202 (FIG. 12) that may include a sub-panel 802 fixed to the flap 716 along left, bottom, and right edges of the flap 716, below the line joining the bottom left and right edges of the seam 902, 904, 906 on a side of the flap 716 that opposes the first multilayer panel 610 when the flap 716 is pointed down (or alternatively, the line past the bottom edges of the left panel 706 and the bottom edge 1206 (FIG. 12A, 12B) of the right panel 708). The flap 716 may be configured to fold back to be adjacent to an outside surface (e.g., a distal surface) of the front panel 704 substantially, where the fold may be along a line joining bottom left and right edges of the seam 902, 904 (or alternatively, past the bottom edges of the left panel 706 and the right panel 708). In one example, the fold 1208 is substantially along an imaginary line extending between the bottom-most edges of the left panel 706 and right panel 708. For example, with reference to FIG. 12, the imaginary line is drawn into the page, along the x-axis, and the imaginary line would be at the folding point just past the bottom edge 1206 of right panel 708. In some examples, when the flap 716 is folded back to be adjacent to the outside surface of the front panel 704, the second pocket 1202 (FIG. 12) may present a downward facing second pocket entrance 1204 (FIG. 12) that lies in substantially a same horizontal plane (an imaginary plane parallel to the x and y axis and going into the sheet of the drawing) as the first pocket entrance 912

Figure 12B:
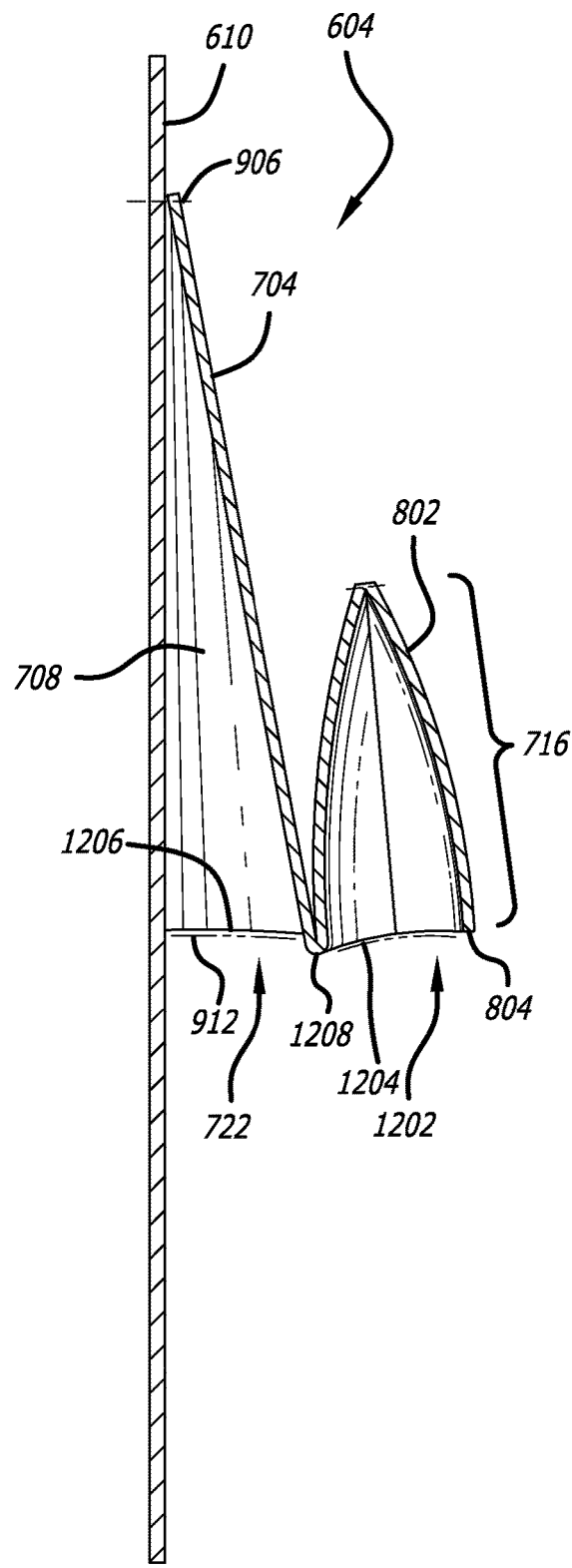
FIG. 12B is the cross-sectional view of FIG. 12A, where the flap has been folded up and back on itself such that the flap is being brought adjacent to an outer surface of the front panel, according to aspects described herein.

In some aspects, when the flap 716 is folded back to be adjacent to the outside surface of the front panel 704, the sub-panel 802 may form a second pocket 1202 (FIG. 12) having the sub-panel 802 as a proximal wall and a portion of the flap 716 adjacent to and opposing the sub-panel 802 as a distal wall. As illustrated in FIG. 12B, according to some aspects, when the flap 716 is folded back to be adjacent to the outside surface of the front panel 704, the second pocket 1202 may present a downward facing second pocket entrance 1204 that lies in substantially a same horizontal plane as the first pocket entrance 912. According to some aspects, the second pocket 1202 (FIG. 12) may be the handle.

The cover 602 may further include a feature 1002 (e.g., a mesh material, a net material, a screen material) fixed to the first multilayer panel 610 adjacent to and surrounding the ventilation opening 720 that allows air to flow bidirectionally 1004 through the ventilation opening 720 while preventing debris and insects from entering an inner area within the confines of the cover 602 through the ventilation opening 720.

FIG. 12A is a cross-sectional view, taken in a vertical (x-z) plane, of the ventilation cover 604 of FIG. 7, according to aspects described herein. FIG. 12B is the cross-sectional view of FIG. 12A, where the flap 716 has been folded up and back on itself such that the flap 716 is being brought adjacent to an outer surface of the front panel 704, according to aspects described herein. The flap 716 was folded along a line drawn into the page, along the x-axis. For example, with reference to FIG. 12A and FIG. 12B, the imaginary line is drawn into the page, along the x-axis, and the imaginary line would be at the fold 1208 just past the bottom edge 1206 of right panel 708 (and just past the bottom-most seam formed on the distal edge of right panel 708 where the distal edge of the right panel 708 is coupled to the front panel 704.

Figure 13:
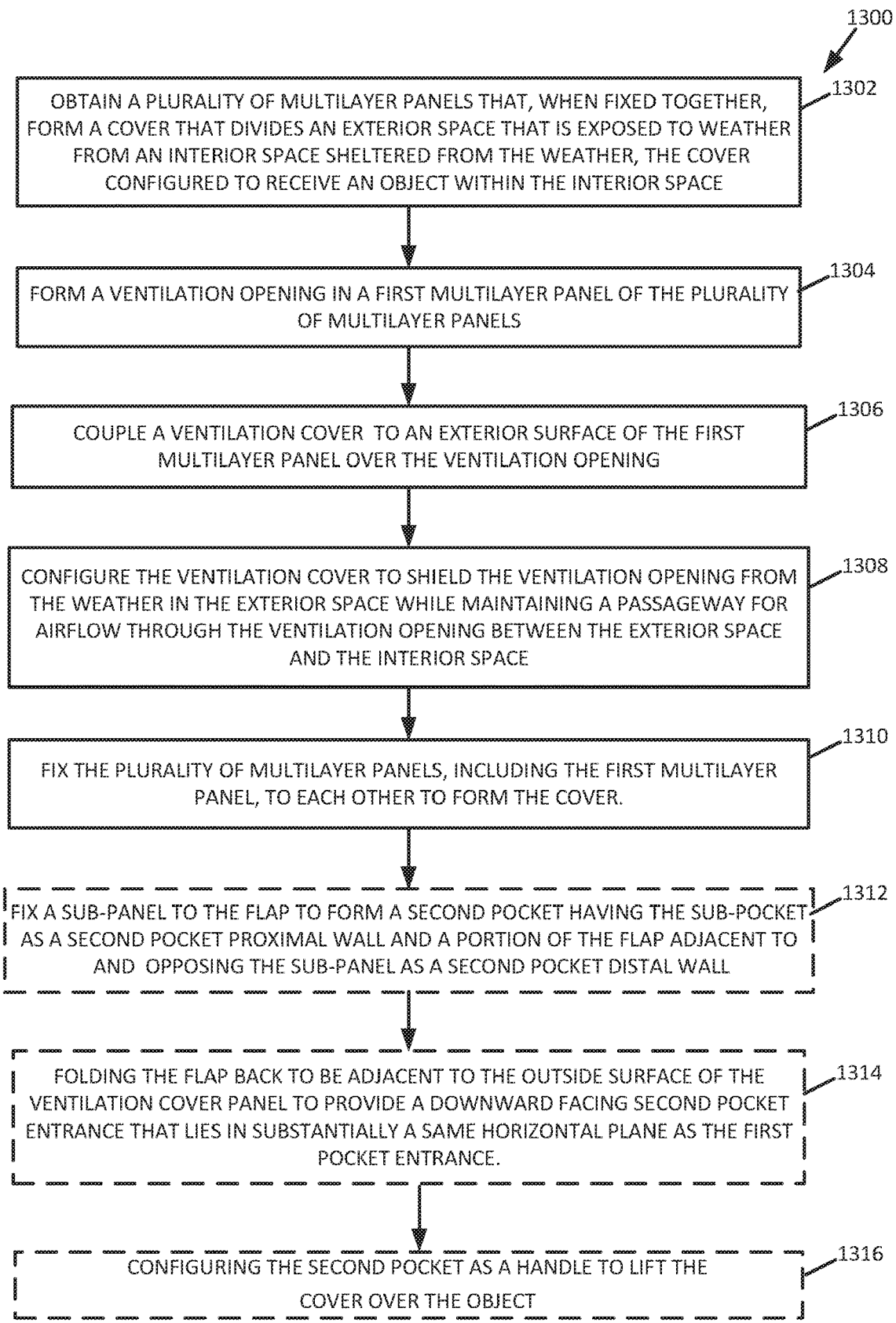
FIG. 13 is flowchart of an exemplary method of making a cover for an object used outdoors, according to aspects described herein.

FIG. 13 is flowchart of an exemplary method 1300 of making a cover for an object used outdoors, according to aspects described herein. The cover fitting over the object and including left, right, front, back, and top sides, according to aspects described herein. The method may include obtaining a plurality of multilayer panels that, when fixed together, form the cover, wherein the cover divides an exterior space that is exposed to weather from an interior space sheltered from the weather, the cover configured to receive the object within the interior space 1302. The exemplary method 1300 may further include forming a ventilation opening having a left, top, right, and bottom perimeter in a first multilayer panel of the plurality of multilayer panels 1304. According to one aspect, when the cover is fit over the object, the first multilayer panel is oriented as at least a part of at least one of the left, right, front, or back sides of the cover. The ventilation opening may be defined by edges of the first multilayer panel that define the perimeter of the ventilation opening. The exemplary method 1300 may still further include covering the ventilation opening with a ventilation cover by fixing the ventilation cover to an exterior surface of the first multilayer panel, (e.g., over the ventilation opening) and adjacent to (e.g., and spaced apart from) the left, top, and right perimeter of the ventilation opening 1306. The exemplary method 1300 may further include configuring the ventilation cover to shield the ventilation opening from the weather in the exterior space while maintaining airflow through the ventilation opening between the exterior space and the interior space 1308. In other words, the ventilation cover may shield the ventilation opening from the weather in the exterior space and may define walls of a passageway in the exterior space to provide for airflow through the ventilation opening between the exterior space and the interior space. As used herein, the word passageway may mean a covered way that allows access between its ends. As used herein, the phrase "walls of a passageway" may mean walls, floor, and ceiling. The exemplary method 1300 may further include fixing the plurality of multilayer panels, including the first multilayer panel, to each other to form the cover 1310. According to some aspects, the ventilation cover may additionally serve as a handle when lifting the cover from the object.

According to some examples of the exemplary method 1300, the ventilation cover may include a front panel having left, right, top, and bottom edges, a left panel having a left panel proximal edge and a left panel distal edge relative to the exterior surface of the first multilayer panel and a left panel top edge and a left panel bottom edge, and a right panel having a right panel proximal edge and a right panel distal edge relative to the exterior surface of the first multilayer panel and a right panel top edge and a right panel bottom edge, and the left panel distal edge of the left panel is fixed to the left edge of the front panel, the right panel distal edge of the right panel is fixed to the right edge of the front panel, the bottom edge of the front panel extends past the left panel bottom edge of the left panel and the right panel bottom edge of the right panel to form a flap that is configured to fold back to be adjacent to an outside surface of the front panel, wherein the left panel proximal edge of the left panel, the top edge of the front panel, and the right panel proximal edge of the right panel are fixed to the first multilayer panel along a seam or seams adjacent to (e.g., and spaced apart from) the left, top, and right perimeter of the ventilation opening, In some examples of the exemplary method 1300 the ventilation cover includes (e.g., comprises) a first pocket having as a proximal wall, a portion of the first multilayer panel adjacent to and including the ventilation opening, and as a distal wall, adjacent to the proximal wall and covering the ventilation opening, a front panel coupled to the portion of the first multilayer panel along a seam adjacent to (e.g., and spaced apart from) the left, top, and right perimeter of the ventilation opening and providing a first pocket having a downward facing entrance configured to remain open. According to some aspects, the first pocket, from the first pocket entrance to the ventilation opening, defines the walls of a passageway in the exterior space to provide for airflow through the ventilation opening between the exterior space and the interior space. In other examples of the exemplary method 1300, the front panel may extend downward, past bottom left and right edges of the seam, to form a flap that is configured to fold back to be adjacent to an outside surface of the front panel substantially along a line joining bottom left and right edges of the seam.

The exemplary method 1300 may further include fixing a sub-panel to the flap along left, bottom, and right edges of the flap, below the line joining the bottom left and right edges of the seam on a side of the flap that opposes the first multilayer panel when the flap is pointed down, to form a second pocket having the sub-panel as a second pocket proximal wall and a portion of the flap adjacent to and opposing the sub-panel as a second pocket distal wall 1312. The method may still further include folding the flap back to be adjacent to the outside surface of the front panel to provide a second pocket having a downward facing entrance that lies in substantially a same horizontal plane as the first pocket entrance 1314. According to the exemplary method 1300, the second pocket may be the handle. The exemplary method may still further include, configuring the second pocket as a handle to lift the cover over the object 1316. In another example, when the flap is folded back to be adjacent to the front panel, the second pocket entrance is configured to receive the one or more fingers of a hand and receive an upward force, propagated through the one or more fingers of the hand, to lift the cover from the object.

One or more of the components and functions illustrated in the previous figures may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

Specific implementations shown and described are only examples and should not be construed as the only way to implement the present disclosure unless specified otherwise herein.

Certain aspects may be described as a process or method that is depicted as a flowchart, a flow diagram, a structure diagram, or a block diagram. Although a flowchart may describe the operations as a sequential process, many of the operations can be performed in parallel or concurrently. In addition, the order of the operations may be re-arranged.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. Similarly, the term "coupled" is used herein with reference to modules/circuits/functions that may electrically and/or mechanically interact with each other in order to achieve a result. As used herein, the term "A and/or B" means A, or B, or both (A and B). As used herein, the phrase "at least one of A or B" means A, or B, or both (A and B). The phrase "at least one of A, B, or C" means A, or B, or C, or "A and B," or "A and C," or "B and C," or "A and B," or "A and B and C." As used herein, the word "adjacent" may mean "next to" (including, alternatively, "next to and touching" and "next to and not touching") or proximate to.

What is claimed is:

1. A method of making a multilayer material, comprising:
   obtaining a first-material comprised of a knitted or woven fabric;
   obtaining a second-material comprised of an elastic thermoplastic polyurethane (TPU) film;
   applying a bonding agent to a surface of at least one of the first-material or the second-material;
   bringing the first-material and the second-material adjacent to each other to bring the bonding agent into contact with opposing surfaces of the first-material and the second-material;
   feeding the first-material and the second-material with the bonding agent therebetween into a machine to bond the first-material to the second-material to form the multilayer material; and
   obtaining a third-material, wherein the TPU film is disposed between the first fabric and the third-material, and the multilayer material that is formed is a three-layer material.

2. The method of claim 1, wherein the multilayer material is a two-layer material.

3. The method of claim 1, further comprising cutting the multilayer material into a plurality of multilayer panels.

4. The method of claim 1, wherein the machine uses at least one of pressure, heat, or microwave energy to bond the first-material to the second-material to form the multilayer material.

5. The method of claim 1, wherein the machine is a laminating machine and the multilayer material is a multilayer laminated material.

6. The method of claim 1, wherein the first-material is configured to face an exterior space that is exposed to weather and the second-material is a configured to face an interior space sheltered from the weather.

7. The method of claim 1, wherein the knitted or woven fabric is made from a knitted or woven fiber, thread, or filament.

8. The method of claim 1, wherein the first-material is a pre-manufactured multilayer material comprised of at least two-layers of different materials and the second-material is different from at least one layer of the pre-manufactured multilayer material.

9. The method of claim 1, wherein the third-material is a second knitted or woven fabric made from a second knitted or woven fiber, thread, or filament.

* * * * *